US012612936B2

(12) United States Patent
Kellner et al.

(10) Patent No.: US 12,612,936 B2
(45) Date of Patent: Apr. 28, 2026

(54) TWO-PIECE HIGH-STRENGTH SCREW

(71) Applicant: KAMAX Holding Gmbh & Co. KG, Homberg (DE)

(72) Inventors: Manuel Kellner, Alsfeld-Altenburg (DE); Thorsten Schmitt, Laubach (DE); Stefan Wallmeier, Goldbach (DE)

(73) Assignee: KAMAX Holding GmbH & Co. KG, Homberg (DE)

( * ) Notice: Subject to any disclaimer, the term of this patent is extended or adjusted under 35 U.S.C. 154(b) by 703 days.

(21) Appl. No.: 17/271,313

(22) PCT Filed: Sep. 26, 2019

(86) PCT No.: PCT/EP2019/075992
§ 371 (c)(1),
(2) Date: Feb. 25, 2021

(87) PCT Pub. No.: WO2020/064910
PCT Pub. Date: Apr. 2, 2020

(65) Prior Publication Data
US 2021/0199149 A1 Jul. 1, 2021

(30) Foreign Application Priority Data

Sep. 26, 2018 (DE) ..................... 10 2018 123 690.5

(51) Int. Cl.
*F16B 35/06* (2006.01)
*F16B 31/02* (2006.01)
*F16B 35/04* (2006.01)

(52) U.S. Cl.
CPC .......... *F16B 31/027* (2013.01); *F16B 35/041* (2013.01); *F16B 35/06* (2013.01)

(58) Field of Classification Search
CPC ......... F16B 35/06; F16B 31/027; F16B 37/14
(Continued)

(56) References Cited

U.S. PATENT DOCUMENTS 2,237,236 A * 4/1941 Matthews ............... F16B 35/06
411/396
3,611,862 A * 10/1971 Walker ................... F16B 35/04
411/397
(Continued)

FOREIGN PATENT DOCUMENTS

AU          78401/91          1/1992
CN          204805270 U       11/2015
(Continued)

OTHER PUBLICATIONS

International Search Report in PCT Application No. PCT/EP2019/075992, dated Dec. 20, 2019.
(Continued)

*Primary Examiner* — Flemming Saether
(74) *Attorney, Agent, or Firm* — Bodman PLC

(57) ABSTRACT

High-strength screw (1), with a head (2) with a tool engagement contour (4), a shank (3) with a free end (5) pointing away from the head (2), a threaded section (6) with a thread (7) being arranged on the shank (3), the thread (7) being formed as a metric ISO thread or inch thread, the head (2) and the shank (3) being de-signed as materially separate parts, the head (2) having a coupling recess (8) arranged radially inside with an axial force transmission element (9) and a torque transmission element (10), the shank (3) having a coupling element (11) arranged radially outside on its outer circumference with an axial force transmission counter element (12) and a torque transmission counter element (13), the coupling element (11) engaging in the coupling recess (8), the axial force transmission element (9) and the axial force transmission counter element (12) being designed and arranged to positively interlock in such a way that an axial translatory movement of the head (2) relative to the shank (3) in the direction away from the free end (5) of the shank (3) is prevented or will be prevented, in particular (Continued)

8  4    2   9      1    3

10, 13, 16a, 16

11    10, 13,14a, 14 non-releasably, and the torque transmission element (10) and the torque transmission counter element (13) being designed and arranged to interlock in such a way that a rotational movement of the head (2) relative to the shank (3) in the tightening direction of the thread (7) is or will be prevented.

14 Claims, 26 Drawing Sheets

(58) Field of Classification Search
USPC ................................................ 411/396, 3, 4
See application file for complete search history.

(56) References Cited

U.S. PATENT DOCUMENTS

| | | | | | |
|---|---|---|---|---|---|
| 3,828,382 | A | | 8/1974 | Nakamura | |
| 3,832,747 | A | * | 9/1974 | Nankivell, Jr. | B21K 1/44 |
| | | | | | 470/5 |
| 3,978,758 | A | | 9/1976 | Bright | |
| 4,321,001 | A | * | 3/1982 | Gruich | F16B 35/00 |
| | | | | | 470/48 |
| 4,413,374 | A | * | 11/1983 | Ferdinand | F16B 37/14 |
| | | | | | 16/441 |
| 4,540,322 | A | * | 9/1985 | Coffia | F16B 41/005 |
| | | | | | 411/338 |
| 4,793,319 | A | * | 12/1988 | Vaughan | F41B 5/0026 |
| | | | | | 411/397 |
| 5,090,853 | A | * | 2/1992 | Madsen | F16B 35/00 |
| | | | | | 411/511 |
| 5,480,273 | A | * | 1/1996 | Jou | F16B 37/14 |
| | | | | | 411/409 |
| 8,696,283 | B1 | * | 4/2014 | Dawson | A63B 53/04 |
| | | | | | 411/383 |
| 2006/0024142 | A1 | | 2/2006 | Ducret | |
| 2013/0136557 | A1 | | 5/2013 | Wang | |

FOREIGN PATENT DOCUMENTS

| | | | | | |
|---|---|---|---|---|---|
| DE | 156467 | C | 11/1904 | | |
| DE | 202008016456 | U1 | 3/2009 | | |
| DE | 102020116616 | A1 | * | 12/2021 | F16B 31/02 |
| JP | S57-075219 | U | 5/1982 | | |
| JP | S5912514 | A | 1/1984 | | |
| JP | S59121514 | U | 8/1984 | | |
| JP | H02-118680 | U | 9/1990 | | |
| JP | 2000213518 | A | 8/2000 | | |
| JP | 2001501717 | A | 2/2001 | | |
| JP | 2018179101 | A | 11/2018 | | |
| JP | S48-021057 | U | 6/2021 | | |
| KR | 0149333 | B1 | 12/1998 | | |
| KR | 100931200 | B1 | 12/2009 | | |
| WO | 2012053250 | A1 | 4/2012 | | |

OTHER PUBLICATIONS

International Preliminary Report on Patentability for PCT Application No. PCT/EP2019/075992; dated Dec. 11, 2020; 7 pp.

* cited by examiner

TWO-PIECE HIGH-STRENGTH SCREW

CROSS REFERENCE TO RELATED APPLICATIONS

This application is the 35 U.S.C. 6371 national stage application of PCT Application No. PCT/EP2019/075992, filed Sep. 26, 2019, which claims the benefit of German Application No. DE 10 2018 123 690.5, filed Sep. 26, 2018, both of which are hereby incorporated by reference herein in their entireties.

TECHNICAL FIELD OF THE INVENTION

The invention relates to a high-strength screw having a head with a tool engagement contour and a shank with a free end pointing away from the head. A threaded section with a thread is arranged on the shank, the thread being formed as a metric ISO thread or inch thread.

Such screws with a metric ISO thread or inch thread are used to make screw connections with a corresponding internal thread of a nut or a component with a threaded hole and are to be distinguished from wood screws and other self-tapping universal screws. Due to their high strength, they are used in particular in specialised technical fields that require such strength—e.g. the automotive industry, aviation industry and mechanical engineering—and are to be separated from the craftsman's sector, DIY sector and hobby sector.

BACKGROUND

A high-strength screw with a head with a tool engagement contour and a shank with a free end pointing away from the head is known from European patent application EP 3 358 021 A1. A threaded section with a thread designed as an ISO metric thread is arranged on the shank.

A screw composed of several separate parts is known from the Chinese patent application CN 103 438 O76 A. A first of these parts is the head of the screw. This has a coupling element arranged radially inside that protrudes from its head contact surface. The coupling element has an approximately star-shaped cross-section. A second of these parts is a shank section. This has a coupling recess corresponding to the coupling element on its free end face facing the head. The coupling recess is also arranged radially inside. For the connection of the head with the shank section, the coupling element is inserted into the coupling recess. A third of these parts is further shank section. In this way, screws of different lengths are assembled from the head and a different number of shank sections.

A similarly constructed screw composed of several separate parts is known from the Chinese patent application CN 103 438 072 A. In this case, the coupling recess is formed as a bore with an internal thread and the coupling element is formed as a threaded section with an external thread, which is arranged in a region of the shank with a reduced external diameter.

The invention is based on the object of providing a high-strength screw that can be manufactured flexibly and economically.

The Object of the invention is achieved according to the invention with the features of the independent patent claims. Further preferred embodiments according to the invention can be found in the dependent patent claims.

SUMMARY

The invention relates to a high-strength screw with a head with a tool engagement contour and a shank with a free end pointing away from the head. A threaded section with a thread is arranged on the shank, wherein the thread is formed as a metric ISO thread or inch thread. The head and the shank are formed as materially separate parts. The head has a coupling recess arranged radially inside with an axial force transmission element and a torque transmission element. The shank has a coupling element arranged radially outside on its outer circumference with an axial force transmission counter element and a torque transmission counter element. In other words, the coupling element may form a part of the shank which delimits the shank radially outside. The coupling element engages the coupling recess. In other words, the coupling element may be the part of the shank which is located in the coupling recess. The condition in which the head has assumed its final or intended position in relation to the shank, in particular the assembled condition, is decisive. The axial force transmission element and the axial force transmission counter element are designed and arranged to positively interlock in such a way that an axial translatory movement of the head relative to the shank in the direction away from the free end of the shank is prevented. The torque transmitting element and the torque transmitting counter element are designed and arranged to interlock in such a way that a rotational movement of the head relative to the shank in the tightening direction of the thread is prevented.

The invention further relates to a forming method for the mechanical production of a high-strength screw, in particular the screw described above and/or below, from a head blank and a shank blank, comprising the following steps:

forming the head blank in a forming tool in such a way that a head of a screw with a coupling recess arranged radially inside with an axial force transmission element and a torque transmission element is produced, threading the head by means of the coupling recess onto a shank blank, forming a part of the shank blank in a forming tool in such a way that a shank with a coupling element arranged radially outside on its outer circumference with an axial force transmission counter element and a torque transmission counter element is produced, and joining of head and shank by translatory displacement of the head in such a way that the coupling element engages in the coupling recess.

These method steps are carried out in the specified order. However, the step of threading the head onto the shank blank can also be carried out after the step of forming the shank blank to create the coupling element. It is also possible that further steps are carried out between the method steps.

Definitions

High-strength screw: In this application, a high-strength screw is understood to be a screw with a tensile strength $R_m$ (or Rm) of at least 800 N/mm2. Typical high-strength screws belong to the strength classes 8.8, 10.9 or 12.9. However, the high-strength screw according to the invention may also be an ultra-high-strength screw with a tensile strength $R_m$ of at least 1,400 N/mm2. The "high-strength" screw according to the invention is therefore at least a high-strength screw, but can also be an ultra-high-strength screw.

Tool engagement contour: A tool engagement contour of the head is understood to be a contour lying on the head of the screw, on which an actuating tool engages to actuate the screw. The contour is formed by a plurality of functional surfaces, which usually connect to each other via corners or radii. In the field of the invention, a tool engagement contour is often referred to as a "driving feature".

Tool engagement outer contour: A tool engagement outer contour is a contour located radially on the outside of the head of the screw, on which an actuation tool engages to actuate the screw. The contour is formed by a plurality of functional surfaces, which usually adjoin one another via corners or radii. In the field of the invention, a tool engagement outer contour is often referred to as "external driving feature".

Tool engagement inner contour: A tool engagement inner contour is a contour located radially inside the head of the screw, in which an actuation tool engages to actuate the screw. The contour is formed by several functional surfaces, which usually connect to each other via corners or radii. The tool engagement inner contour delimits a central recess in the head of the screw in the radial direction. In the field of the invention, a tool engagement inner contour is often referred to as an "internal driving feature".

Polygon: In this application, a polygon is understood to be a design of a tool engagement outer contour of the head of the screw and a torque-transmitting counter-element of the shank of the screw ("outer polygon") or a tool engagement inner contour of the head of the screw and a torque-transmitting element of the head of the screw ("inner polygon"), in which the approximately straight-line functional surfaces of the sub-units of the polygon within the sub-unit adjoin one another via a corner at an angle of 120°.

Multi-tooth: In this application, a multi-tooth is understood to be a formation of a tool engagement outer contour of the head of the screw and a torque-transmitting counter-element of the shank of the screw ("outer multi-tooth") or a tool engagement inner contour of the head of the screw and a torque-transmitting element of the head of the screw ("inner multi-tooth"), in which the approximately straight-line functional surfaces of the sub-units of the multi-tooth within the sub-unit adjoin one another via a corner at an angle of 90°.

Multi-round: In this application, a multi-round is understood to be a design of a tool engagement outer contour of the head of the screw and a torque transmission counter element of the shank of the screw ("outer multi-round") or a tool engagement inner contour of the head of the screw and a torque transmission element of the head of the screw ("inner multi-round"), in which the rounded functional surfaces connect to each other via round corners.

Star: In this application, a star is understood to be a design of a torque transmission counter element of the shank of the screw or a torque transmission element of the head of the screw, in which the approximately rectilinear functional surfaces of the sub-units of the star within the sub-unit adjoin one another via a corner at an angle of 60°.

Geometry type: In this application, a geometry type is understood to be the underlying geometric shape of the tool engagement contour, the torque transmission element and the torque transmission counter element. Typical geometry types are polygon, multi-tooth and multi-round. No distinction is made between the outer contour and the inner contour. This means, for example, that an external polygon and an internal polygon belong to the same first geometry type, an external multi-tooth and an internal multi-tooth belong to the same second geometry type and an external multi-round and an internal multi-round belong to the same third geometry type.

Materially separated parts: The head and the shank of the screw are formed as materially separate parts. This is understood in this application to mean that they have been manufactured as non-cohesive, non-integral, separate parts. However, in the finished position of the screw, the head and the shank are joined together. This connection was therefore only realised after their separate manufacture.

The new high-strength screw with a metric ISO thread or inch thread is designed as at least a two-piece screw with a head and a shank, which are joined together in a specific way. The connection is not made by means of a thread or any other type of connection that can be loosened at will. Instead, the connection is made in such a way that the head and the shank can be separated from each other essentially only destructively. The screw may also have other parts.

With the new type of connection between the head and the shank of the screw, the following two technical aspects, among others, must be observed when tightening a screw connection:

In order for the screw connection to achieve the desired locking effect, a sufficiently large axial preload force must be applied via the head of the screw—more precisely via the head contact surface of the head of the screw ("axial force transmission"). To achieve this preload force, the head and the shank must be screwed together in the tightening direction of the thread. The torque required for this is applied by means of an actuating tool via the tool engagement contour of the head and transmitted to the shank ("torque transmission"). However, since the head and the shank are designed to be materially separate, this torque transmission requires that movement of the head relative to the shank in the direction away from the free end of the shank be prevented.

The new two-piece high-strength screw has a coupling recess on the head and a corresponding coupling element on the shank for the realisation of these two functions of axial force transmission and torque transmission. The coupling recess in turn has an axial force transmission element and a torque transmission element. The coupling element of the shank has a corresponding axial force transmission counter element and a torque transmission counter element. The axial force transmission element and the axial force transmission counter element cooperate in such a way that the required preload force can be achieved. Thus, movement of the head of the bolt in the direction away from the free end of the shank is prevented when the axial force transmission element and the axial force transmission counter element engage with each other. The torque transmission element and the torque transmission counter element cooperate in such a way that the desired torque can be transmitted from the head to the shank and the screw can thus be operated. This applies at least in the tightening direction of the thread.

The screws can be comparatively thin and long. Such screws with a large length to thickness ratio (LIT) can only be produced with a relatively low number of cycles in the prior art. This low number of cycles results from the fact that the screw to be produced in a multi-stage press must be ejected and pushed in over the entire shank length in each stage of the multi-stage press. Furthermore, there are also quality problems in the production of such screws, as the buckling rigidity of the screw and the forming tool decreases with increasing length of the screw.

With the new separate screw consisting of head and shank, high-strength screws can now be produced economically and to a high quality even if the shank of the screw is comparatively thin and long. The new design of the screw can also be applied to other screw geometries.

The head of the screw is manufactured separately, so that there is no negative influence of the large shank length in the manufacture of the head. The forming of the shank to create the coupling element, on the other hand, is possible in a one-step process, which also requires far less material to be elastically-plastically deformed. Thus, the problems of the low number of cycles and the too low buckling stiffness of the prior art for the forming to be carried out do not exist. The screw length is not limited by the installation space of the press. The number of cycles is independent of the screw length. The high-strength screws can be produced by using pre-hardened material. This eliminates the need for subsequent quenching and tempering and further reduces manufacturing costs. The new two-piece screw is suitable for standardisation, which can reduce set-up times.

The coupling recess may be stepped and have a first portion with a first inner diameter and a second portion with a second inner diameter. Advantageously, the first portion and/or the second portion is formed by a cylindrical or by a conical lateral surface, which is rotationally symmetrical, in particular about an extension direction of the shank in an assembled state. Advantageously, a step region is provided between the first portion and the second portion. The first inner diameter is larger than the second inner diameter. The second portion is located closer to the free end of the shank than the first portion. This allows the second portion to form the axial force transmission element in the sense of an axial stop or to be arranged adjacent to it. Advantageously, the axial force transmission element is at least partially, preferably completely, formed by the step region. Beyond this axial stop, a movement of the head in the direction of the free end of the shank is not possible or is positively prevented by this stop. However, the head may be movable away from the stop in the other direction. However, such movement can also be prevented, in particular by a press fit of the first portion and/or the second portion, in particular with parts of the shank. Alternatively or additionally preferably, this can also be achieved by an undercut, an oversize, caulking or other elastic-plastic deformation. However, it is also possible that no such separate securing is realised, but that this securing is achieved by the threaded section.

The coupling element advantageously comprises at least a first section and a second section. The first section and/or the second section advantageously each has/have an outer lateral surface which delimits or limits the coupling element radially outside. The first section and/or the second section is advantageously formed rotationally symmetrically about the direction of extension of the shank. In other words, the first section can, for example, be conical, cylindrical or barrel-shaped about the direction in which the shank extends; this results in particularly simple and cost-effective production. The direction of extension of the shank is in particular the direction in which the shank extends and/or in which the length of the shank is measured. Expediently, the outer diameter of the first section is larger than the outer diameter of the second section. The average outer diameter of the first or the second section is decisive for this dimensioning. These different outer diameters of the first section and the second section make it possible to create the axial force transmission counter element in a particularly space-saving way.

Advantageously, the first section contacts the first portion of the coupling recess and/or the second section contacts the second portion of the coupling recess. Expediently, the first section forms a press fit with the first portion of the coupling recess and/or the second section forms a press fit with the second portion of the coupling recess. The press fit may provide frictional torque transmission between the shank and the head between the first section and the first portion of the coupling recess and/or between the second section and the second portion of the coupling recess. In other words, the torque transmission counter element may be formed by the first section and/or by the second section of the coupling element, the torque transmission being effected, in particular exclusively, by frictional engagement through the or these press fit(s). This type of torque transmission is particularly cost-effective, since no form-fitting means need to be created in the first section and in the first portion of the coupling recess and/or in the second section and in the second portion of the coupling recess. Alternatively preferably, part of the torque transmission can also be effected by form-fit means and another part of the torque by a frictional connection.

In an advantageous embodiment, the press fit between the first section of the coupling element and the first portion of the coupling recess is such that the press fit increases in the direction towards the free end of the shank. In other words, this may mean that the pressures caused by the press fit on the surface of the first section of the coupling element and on the surface of the first portion of the coupling recess are such that their magnitude increases towards the free end of the shank. In this way, a particularly strong press fit can be achieved, which can also reliably transmit high torques.

In an alternatively or additionally preferred embodiment, the press fit between the second section of the coupling element and the second portion of the coupling recess is such that the press fit decreases in the direction towards the free end of the shank. In other words, this may mean that the pressures caused by the press fit on the surface of the second section of the coupling element and on the surface of the second portion of the coupling recess are such that their magnitude decreases towards the free end of the shank. This may achieve that no stress peaks occur at the end of the contacting part of the second section of the coupling element towards the free end of the shank. For example, this can be achieved by the second section of the coupling element being conical, with the diameter of this cone decreasing towards the free end of the shank. In this way, a particularly strong press fit can be achieved, which can also reliably transmit high torques.

Advantageously, an intermediate section lies between the first section and the second section of the coupling element, wherein advantageously the intermediate section, in particular completely, forms the axial force transmission counter element. In this way, a particularly compact shank can be achieved. Advantageously, this intermediate section is partially conical, as this allows particularly simple production.

Expediently, the first section of the shank is bounded in the direction towards the free end of the shank by a first transition region of the intermediate section. In other words, this may mean that the intermediate portion has a first transition region closest to the first section. For example, this first transition region is a chamfer or a step. Advantageously, however, the first transition region is formed by a rounding, said rounding having a first rounding radius. The ratio of this first rounding radius to the outer diameter of the first section is advantageously in a range from 0.01 to 0.4, preferably in a range from 0.02 to 0.25 and more preferably in a range from 0.04 to 0.15. A ratio of 0.01 to 0.4 results in particularly simple manufacture of the intermediate section. At a ratio of 0.02 to 0.25, on the other hand, a particularly low notch effect can be achieved, so that the strength of the screw can be increased. With a ratio in the range of 0.04 to 0.15, the applicant has surprisingly found that a particularly advantageous ratio results between the vibration resistance of the screw, in particular under pulsating load, and the static strength of the screw.

Alternatively or additionally preferably, the second section of the shank is bounded opposite the direction towards the free end of the shank by a second transition region of the intermediate section. In other words, this may mean that the intermediate section has a second transition region closest to the second section. For example, this second transition region is a chamfer or a step. Advantageously, however, the second transition region is formed by a rounding, said rounding having a second rounding radius. The ratio of this second rounding radius to the outer diameter of the second section is advantageously in a range from 0.01 to 0.4, preferably in a range from 0.02 to 0.25 and more preferably in a range from 0.04 to 0.15. A ratio of 0.01 to 0.4 results in particularly simple manufacture of the intermediate section. At a ratio of 0.02 to 0.25, on the other hand, a particularly low notch effect can be achieved, so that the strength of the screw can be increased. With a ratio in the range of 0.04 to 0.15, the applicant has surprisingly found that a particularly advantageous ratio results between the vibration resistance of the screw, in particular under pulsating load, and the static strength of the screw.

It is particularly expedient if the ratio of the second rounding radius to the first rounding radius is in a range of 0.8 to 1.8, because this makes it possible to produce these roundings particularly easily. A particularly optimal notch effect ratio can be achieved if the ratio of the second rounding radius to the first rounding radius is in a range of 1.01 to 1.6.

The coupling element can form an axial counter stop corresponding to the axial stop, the outer diameter of which is greater than the outer diameter of the shank and greater than the second inner diameter of the coupling recess. The counter stop can advantageously have a conical section. The pair of stop and counter stop prevents the axial translational movement of the head in the direction of the free end of the shank, which is to be prevented for the application of the preload force.

The first portion of the coupling recess may form the torque transmission element. However, it is also possible that the second portion forms the torque transmission element. It is also possible that both portions form the torque transmission element. These two portions do not have to be directly adjacent to each other. Other portions can also be arranged in between, which fulfil other functions or none at all.

The torque transmission element and the torque transmission counter element may be designed and arranged to positively interlock. Such an interlock can be realised in particular in such a way that the torque transmission element and the torque transmission counter-element belong to the geometry type polygonal, multi-tooth, multi-round or star. However, other geometric designs are also possible that provide the desired interlock. An example is a knurl. However, it is also possible to choose a different type of torque transmission. One possibility is a frictional connection. This can be realised in particular in the sense of a negative-allowance fit.

The torque transmission element and the torque transmission counter element may be designed and arranged to interlock in such a way that a rotational movement of the head relative to the shank in the direction of loosening rotation of the thread is also prevented. This represents the normal case in which the screw can be actuated equally in both directions of rotation without restrictions.

The torque transmission element and the torque counter-transmission element may each be formed symmetrically in the circumferential direction. This symmetry is to be understood as meaning that the torque transmission element and torque counter transmission element are formed in such a way that—apart from the fact that loosening of the screw connection takes place in one direction of rotation and tightening of the screw connection in the other—they act in the same way irrespective of the direction of rotation.

The torque transmission element and the torque transmission counter element may also be formed asymmetrically in the circumferential direction. In this way, a different interaction can be achieved depending on the direction of rotation. For example, the asymmetry can be designed in such a way that a rotational movement of the head relative to the shank in the direction of loosening of the thread is not prevented. This achieves a secure screw connection that cannot be loosened by unauthorised third parties, or at least not without additional measures.

The torque transmission element and the torque transmission counter element may be formed in such a way that they determine the maximum tightening torque of the screw and, if the maximum tightening torque is exceeded, no longer prevent the rotational movement of the head relative to the shank in the tightening direction of the thread. In this way, a torque safety function is provided by the screw itself. This prevents the tightening of a screw connection beyond the maximum tightening torque.

The shank of the screw may consist of high-strength steel or a fibre composite material (e.g. CFRP). The head of the screw can also be made of high-strength steel or a fibre composite material (e.g. CFRP). Due to the two-part design of the screw, many different material pairings are conceivable in principle, as long as the strength requirements in the sense of a high-strength screw are met. The choice of material can also be influenced by assigning certain electrically conductive or insulating properties to the head and the shank. For this purpose, e.g. metal, in particular steel, can also be surrounded by an insulating plastic sheath. For example, the head of the screw can be electrically conductive and the shank of the screw electrically non-conductive. The opposite constellation is also possible.

The new method is for manufacturing a high strength screw as described above. In any of the steps described above, the screw may further have one or more of the features described above.

Before the step of threading the head onto the shank blank by means of the coupling recess, the head blank can be formed in a forming tool in such a way that a tool engagement contour is produced. The tool engagement contour can be a tool engagement outer contour or a tool engagement inner contour. This can be of the geometry type polygonal, multi-tooth or multi-round.

After the step of joining the head to the shank, the head can be secured to the shank to prevent axial translational movement of the head relative to the shank in the direction of the free end of the shank. This securing can be done, for example, by an undercut, an oversize, caulking or other elastic-plastic deformation. However, it is also possible that no such separate securing is realised, but that this securing is achieved by the threaded section.

The forming process for the mechanical non-cutting production of the high-strength screw is in particular a cold forming process. The process is carried out by means of a forming tool in a forming press, in particular a multi-stage press. The shank blank can be held in the forming press by clamping jaws during the forming of its axial end region. The forming of the axial end region of the shank blank can be carried out by means of a translatory moved punch.

To achieve the high strength of the screw, it can be subjected to a heat treatment during its manufacture. The heat treatment may in particular be bainitisation (interstage quenching and tempering) to produce a bainite structure.

The forming for producing the threaded section can in particular be rolling or milling. In particular, it can be a cold forming.

The starting material used to produce the high-strength screw is commonly referred to as "wire". The wire used for the new high-strength screw may consist of cold-workable untempered steel and have a carbon content of about 0.2% to 0.6% or about 0.2% to 0.5%.

The steel may have alloy contents, in particular Cr, Mo, Mn, Ni, V, Nb or Ti, in particular totalling more than about 1.1%.

The new high-strength screw can have a bainite structure, which has been produced in particular at least partially by bainitisation. The bainite structure leads to a very high tensile strength with an equally very high ductility. This high ductility or toughness distinguishes the bainite structure substantially from a martensite structure, which in the prior art is produced in a known manner by hardening with subsequent tempering. In the case of interstage quenching and tempering, hardening is instead achieved by rapid cooling from the austenite phase through an isothermal microstructural transformation in the bainite stage. In this process, the part, in particular the screw, remains in the salt bath at an isothermal temperature until the structural transformation from austenite to bainite is completed over the entire cross-section. The tempering process required for martensitic hardening can preferably be omitted. This also reduces the tendency to hardening distortion.

Advantageous further embodiments of the invention result from the patent claims, the description and the drawings. The advantages of features and of combinations of several features mentioned in the description are merely exemplary and may have an alternative or cumulative effect without the advantages necessarily having to be achieved by embodiments according to the invention. Without this changing the subject-matter of the appended claims, the following applies with regard to the disclosure content of the original application documents and the patent: further features are to be taken from the drawings—in particular the geometries shown and the relative dimensions of several components to each other as well as their relative arrangement and operative connection. The combination of features of different embodiments of the invention or of features of different patent claims is also possible in deviation from the chosen back relationships of the patent claims and is hereby suggested. This also applies to those features which are shown in separate drawings or are mentioned in the description thereof. These features may also be combined with features of different claims. Likewise, features listed in the patent claims may be omitted for further embodiments of the invention.

The features mentioned in the patent claims and the description are to be understood with regard to their number in such a way that exactly this number or a greater number than the number mentioned is present, without the explicit use of the adverb "at least" being required. Thus, for example, if one thread is mentioned, this is to be understood as meaning that exactly one thread, two threads or more threads are present. These characteristics may be supplemented by other characteristics or may be the only characteristics of which the respective product consists.

The reference signs contained in the patent claims do not constitute a limitation of the scope of the objects protected by the patent claims. They merely serve the purpose of making the patent claims easier to understand.

BRIEF DESCRIPTION OF THE DRAWINGS

In the following, the invention is further explained and described with reference to preferred embodiments shown in the figures.

DETAILED DESCRIPTION

Figure 1:
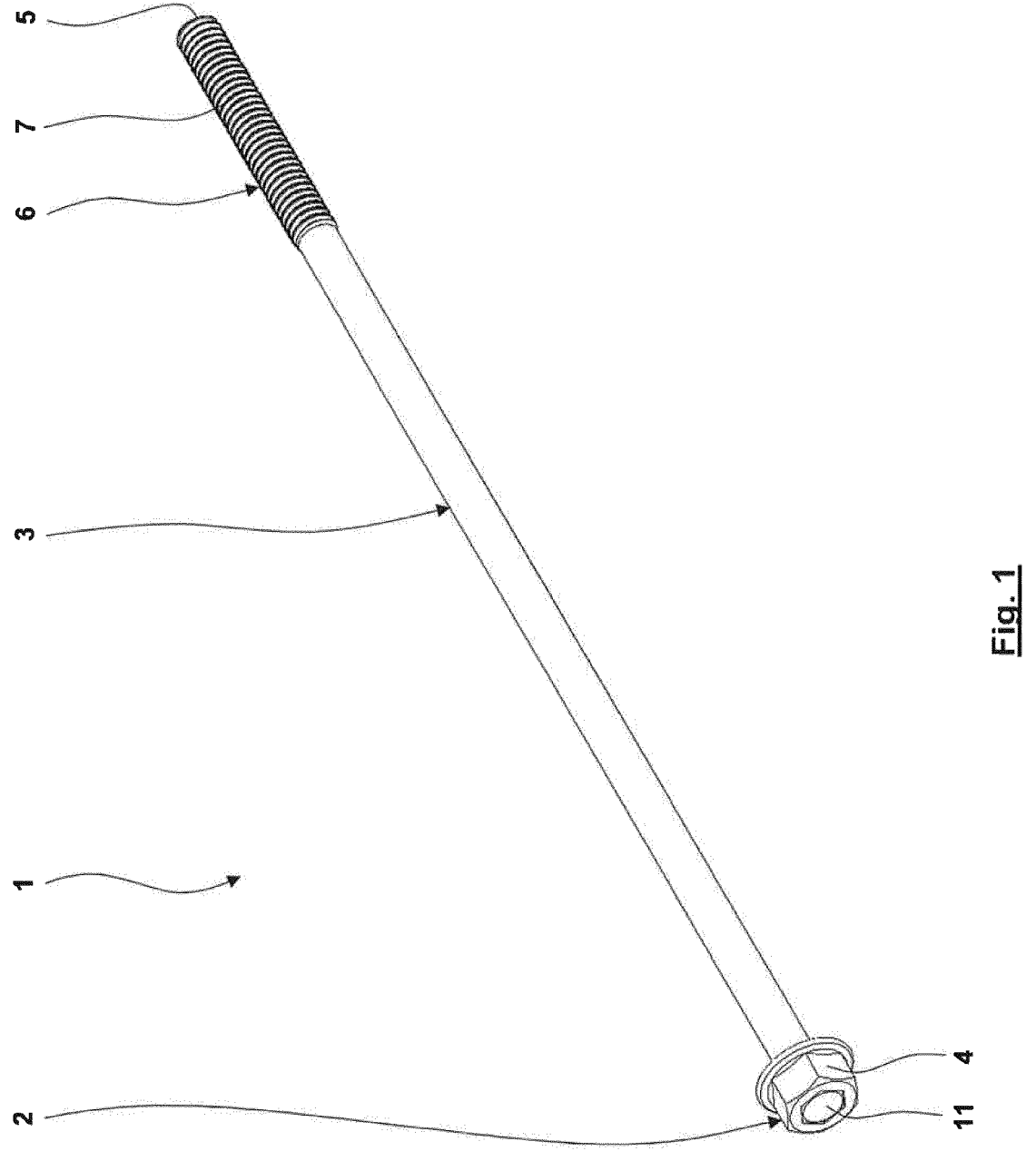
FIG. 1 shows a perspective view of a first exemplary embodiment of the new high-strength screw.
Figure 2:
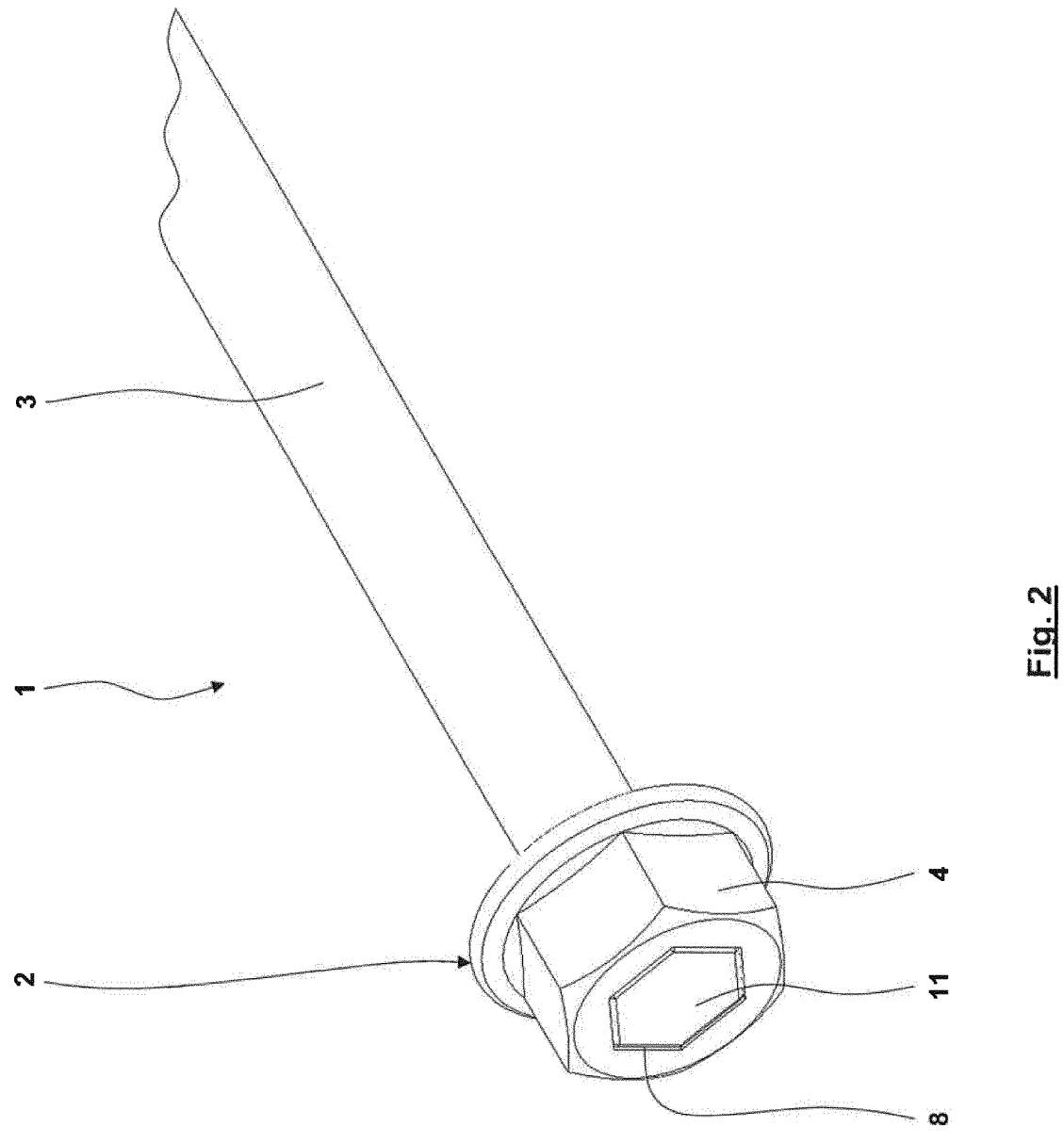
FIG. 2 shows an enlarged perspective view of a part of the screw according to FIG. 1.
Figure 3:
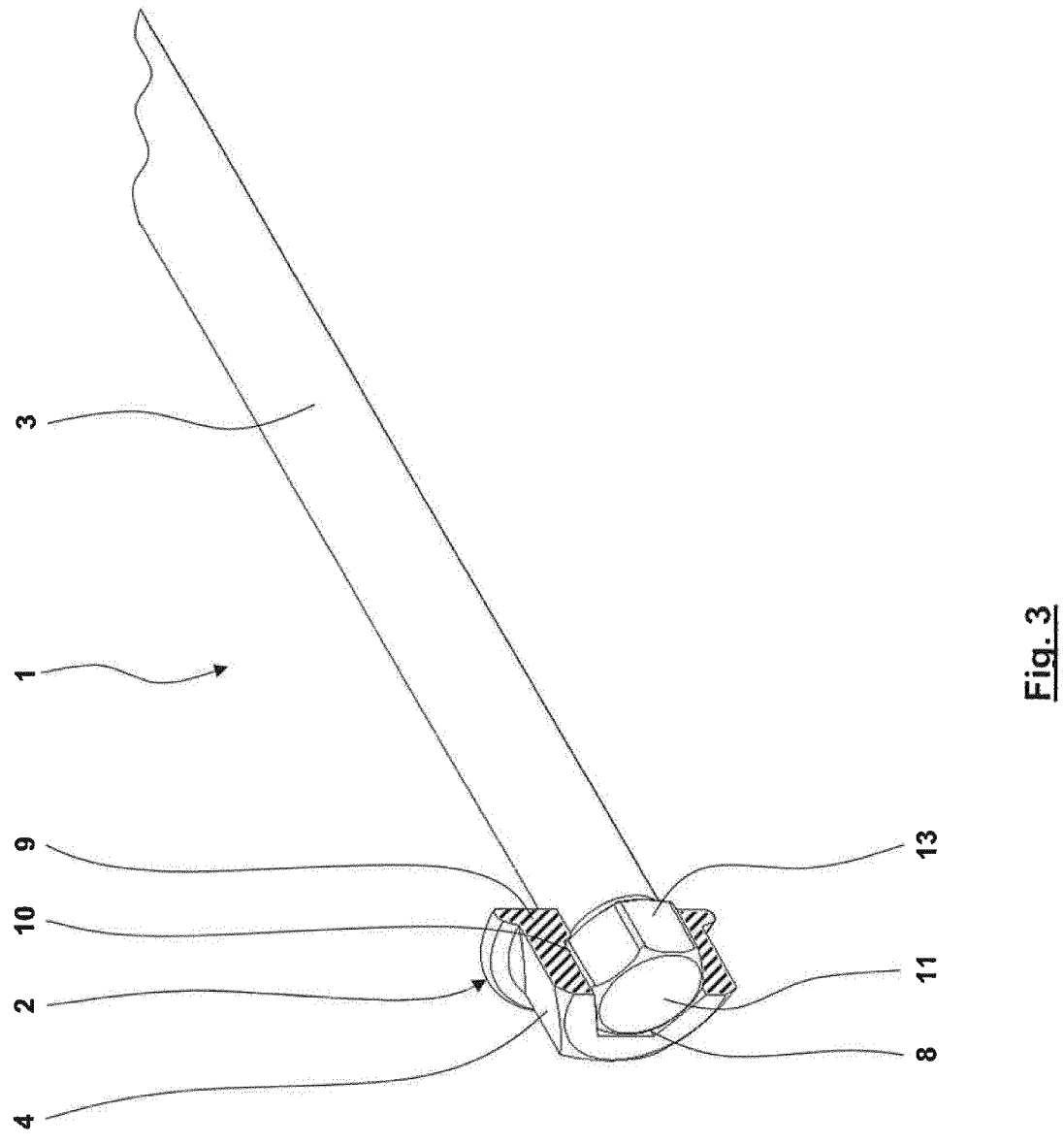
FIG. 3 shows a partially cut away perspective view of the screw according to FIG. 2.

FIGS. 1-4 show various views of a first exemplary embodiment of a new high-strength screw 1. The screw 1 is a high-strength screw 1 with a tensile strength of at least 800 N/mm$^2$, in particular an ultra-high-strength screw 1 with a tensile strength of at least 1400 N/mm$^2$. The same applies to the other embodiments of the screw 1.

The screw 1 has a head 2 and a shank 3. The head 2 and the shank 3 are designed as separate components that were first manufactured separately and only then joined together.

The head 2 has a tool engagement contour 4 which is used to actuate the head in the sense of tightening or loosening a screw connection made with the screw 1. In the present case, this is a tool engagement outer contour. However, it could also be a tool engagement inner contour instead. Combinations of both types of contour are also possible. In the example shown, the geometry type of the tool engagement contour is a hexagon. However, other geometry types are also possible.

The shank 3 has a free end 5 pointing away from the head 2. A threaded section 6 with a thread 7 is arranged on the shank 3. In the present case, it is arranged in the area of the free end 5. However, it could also be arranged at another point of the shank 3 alternatively or additionally. In the example shown, the thread 7 is a metric ISO thread. However, it could also be an inch thread.

The head 2 and the shank 3 of the screw 1 are designed as materially separate parts. For this purpose, the head 2 has a radially inner coupling recess 8 with an axial force transmission element 9 and a torque transmission element 10. The shank 3 has a corresponding coupling element 11 arranged radially outside on its outer circumference with an axial force transmission counter element 12 and a torque transmission counter element 13. The coupling element 11 engages in the coupling recess 8 to establish the connection between the head 2 and the shank 3. The torque transmission counter element 13 may thereby comprise form-fitting means, such as a polygon, multi-tooth or multi-round. Alternatively, the torque transmission counter element can also be formed by forming a press fit with the torque transmission element in order to achieve a frictionally engaged torque transmission.

The axial force transmission element 9 and the axial force transmission counter element 12 are positively interlocked and arranged to prevent axial translational movement of the head 2 relative to the shank 3 in the direction away from the free end 5 of the shank 3. The torque transmission element 10 and the torque transmission counter element 13 are designed and arranged to interlock in such a way that a rotational movement of the head 2 relative to the shank 3 in the tightening direction of the thread 7 is prevented. In the present case, this interlocking takes place in a form-fitting manner. However, other types of torque transmission—e.g. a force transmission or a frictional engagement—are also possible.

The coupling recess 8 is stepped and has a first portion 14 with a first inner diameter 15 and a second portion 16 with a second inner diameter 17. The first inner diameter 15 is larger than the second inner diameter 17, wherein the second portion 16 is arranged closer to the free end 5 of the shank 3 than the first portion 14. In this way, the second portion 16 can form the axial transmission element 9 in the sense of an axial stop. However, in the situation illustrated in FIG. 4, the axial transmission element 9 is formed by a step region which contacts the axial force transmission counter element 12, the axial force transmission counter element 12 being formed by an intermediate section which is located between the first section 14a and the second section 16a of the coupling element. The first portion 14 contacts the first section 14a of the coupling element 11 and the second portion 16 contacts the second section 16a of the coupling element 11.

The coupling element 11 forms an axial counter stop corresponding to the stop, the outer diameter of which is greater than the outer diameter of the shank 3 and greater than the second inner diameter 17 of the coupling recess 8.

The first portion 14 forms the torque transmission element 10, but the torque transmission element 10 could also be additionally or alternatively formed by the second portion 17 or another part.

In the present case, the torque transmission element 10 and the torque transmission counter element 13 belong to the geometry type polygonal and in particular hexagonal. However, other geometry types are also possible.

The torque transmission element 10 and the torque transmission counter element 13 are designed and arranged to interlock in such a way that a rotational movement of the head 2 relative to the shank 3 in the loosening direction of the thread 7 is also prevented. In the present case, the torque transmission element 10 and the torque transmission counter element 13 are each designed symmetrically in the circumferential direction. As a result, the torque transmission takes place in the same way regardless of the direction of rotation. However, it is also possible that the torque transmission element 10 and the torque transmission counter element 13 are each asymmetrical in the circumferential direction. This is explained in more detail below with reference to FIGS. 25-29.

In the following explanations of the further embodiments of the new screw 1, not everything will be repeated that was explained with regard to the first exemplary embodiment of the screw 1 according to FIGS. 1-4 in order to avoid unnecessary repetitions. Reference is made to these explanations in their entirety, unless reference is made to the respective difference between the embodiments.

Figure 4:
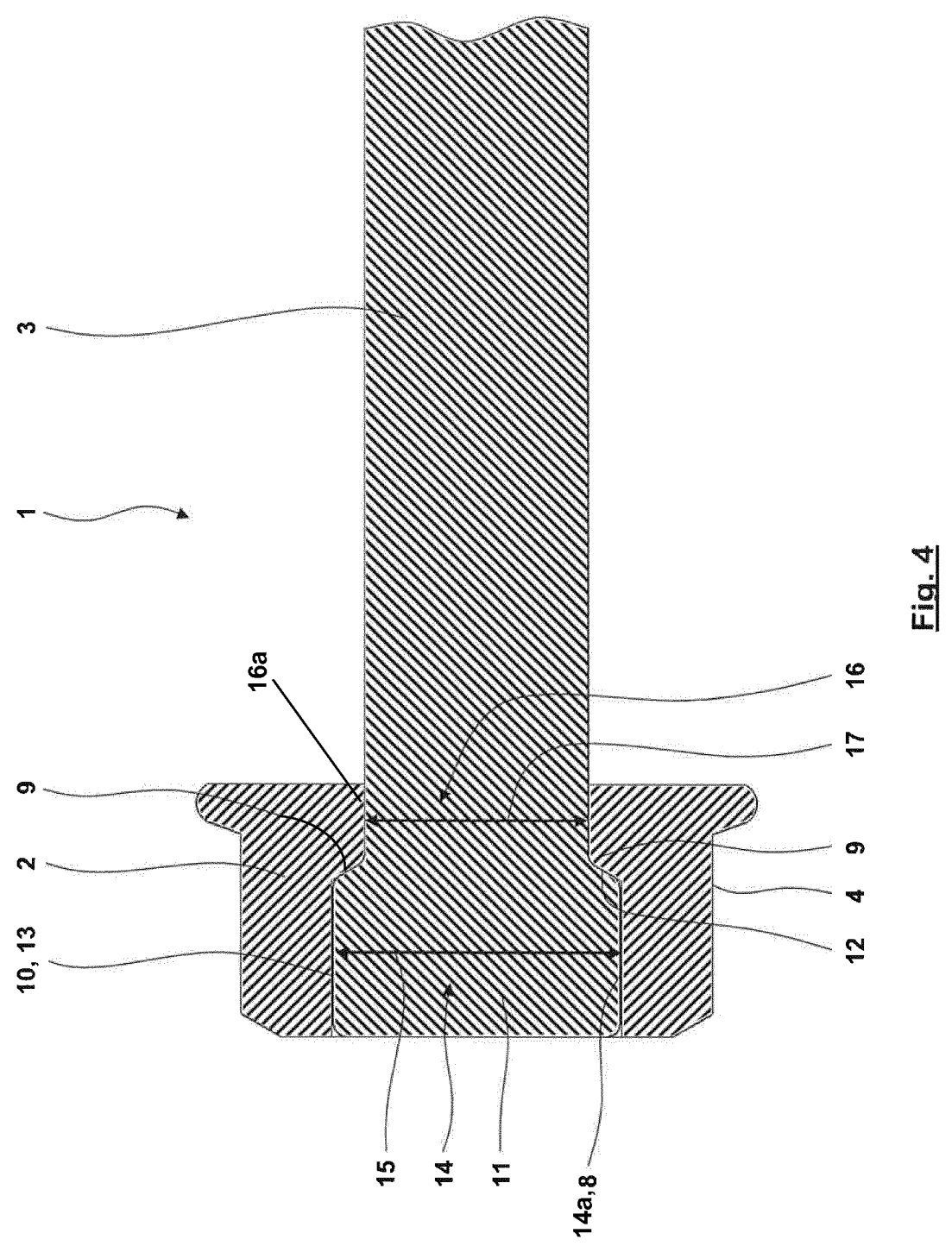
FIG. 4 shows a sectional view of a part of the screw according to FIG. 1.
Figure 5:
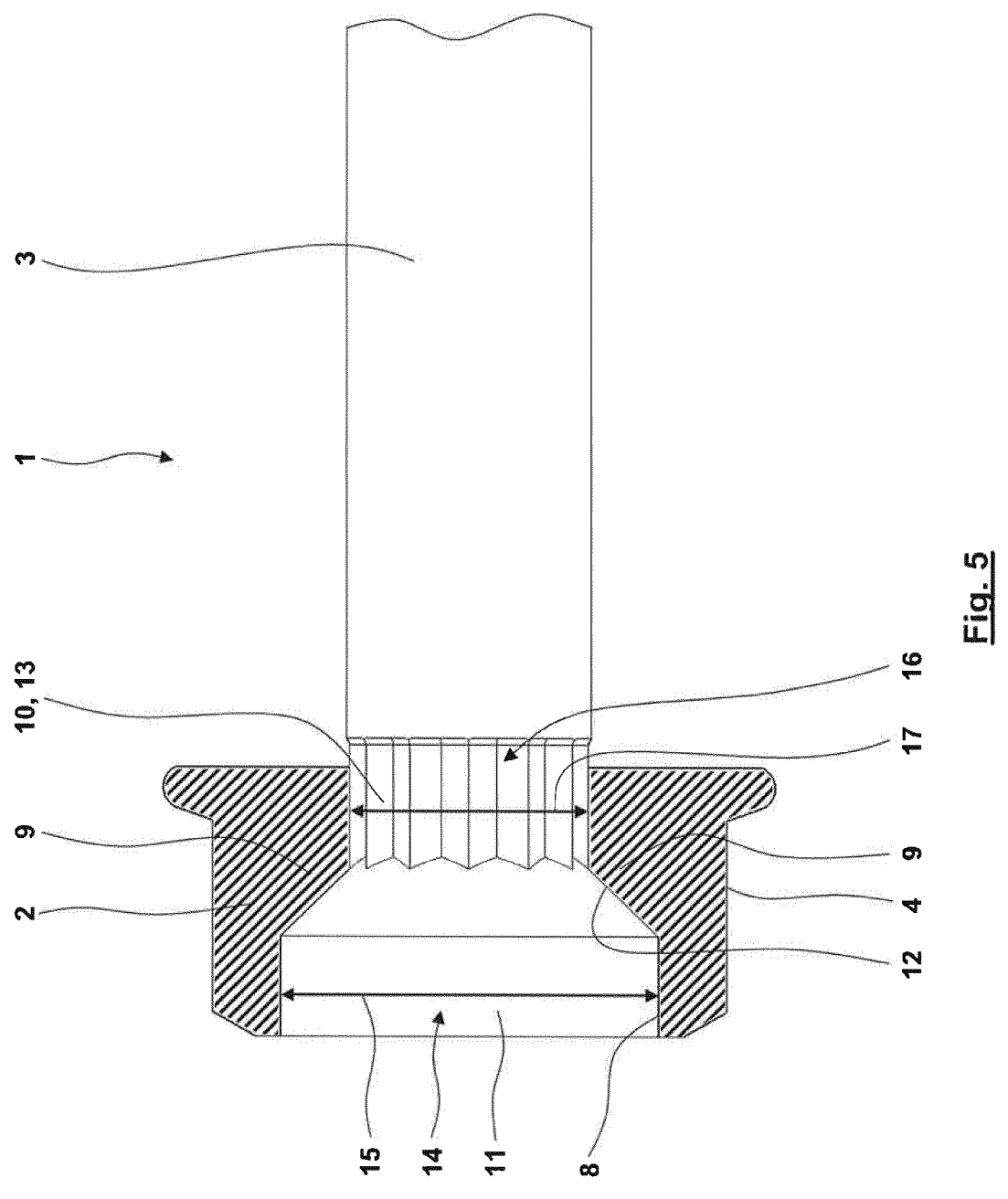
FIG. 5 shows a sectional view of a second exemplary embodiment of the new screw.

FIG. 5 shows a view corresponding to FIG. 4 of a second exemplary embodiment of the new screw 1. The coupling recess 8 and the coupling element 11 are designed differently here. The torque transmission element 10 is not arranged in the first portion 14, but in the second portion 16. The torque transmission thus takes place in the portion of the end of the head 2 that points towards the free end 5 of the shank 3.

Figure 6:
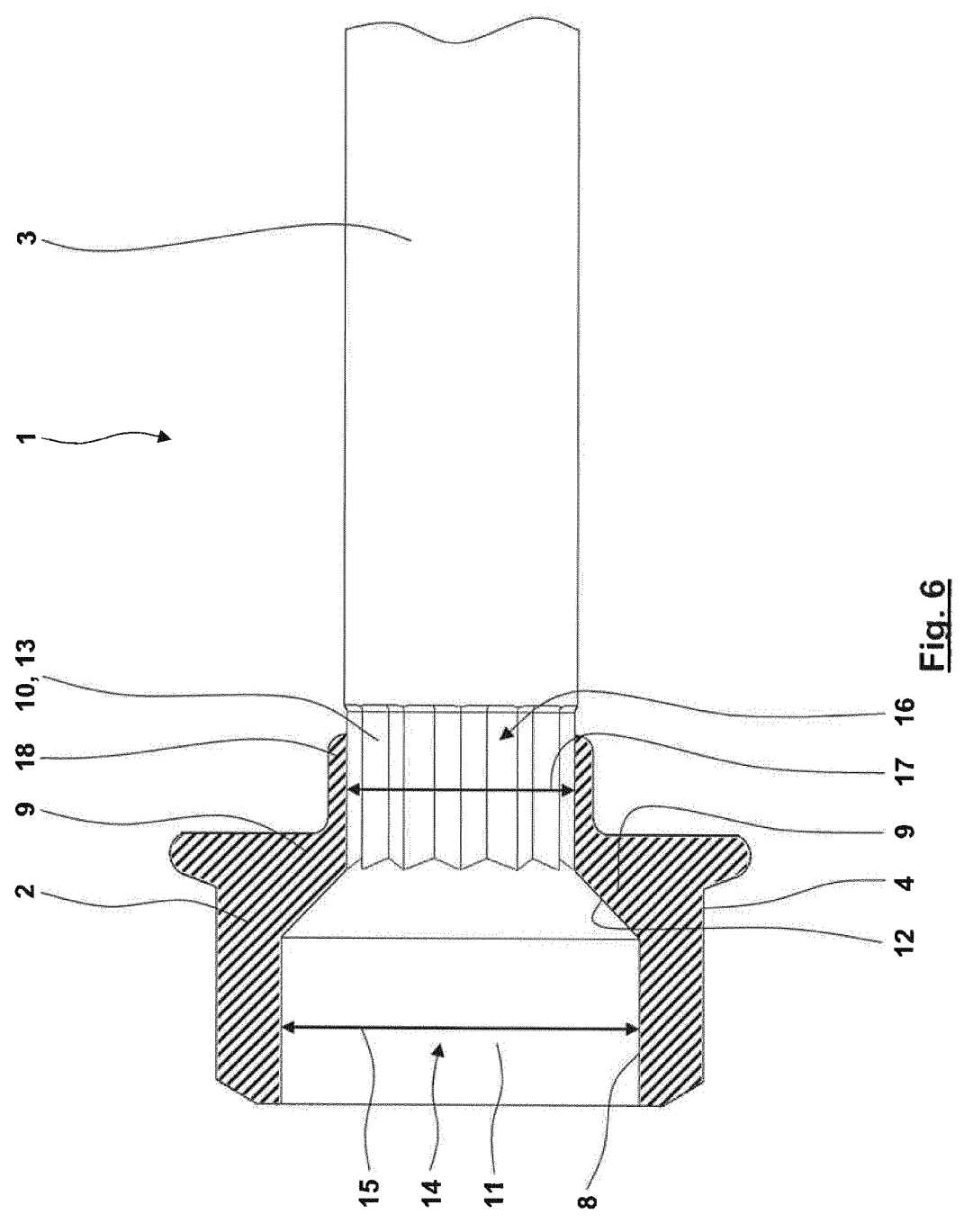
FIG. 6 shows a sectional view of a third exemplary embodiment of the new screw.

A third exemplary embodiment of the new screw 1 is shown in FIG. 6. There it can be seen that the head 2 can also have an axially longer collar 18. In this case, most of the torque transmission takes place in the area of the collar 18 of the head 2.

Figure 7:
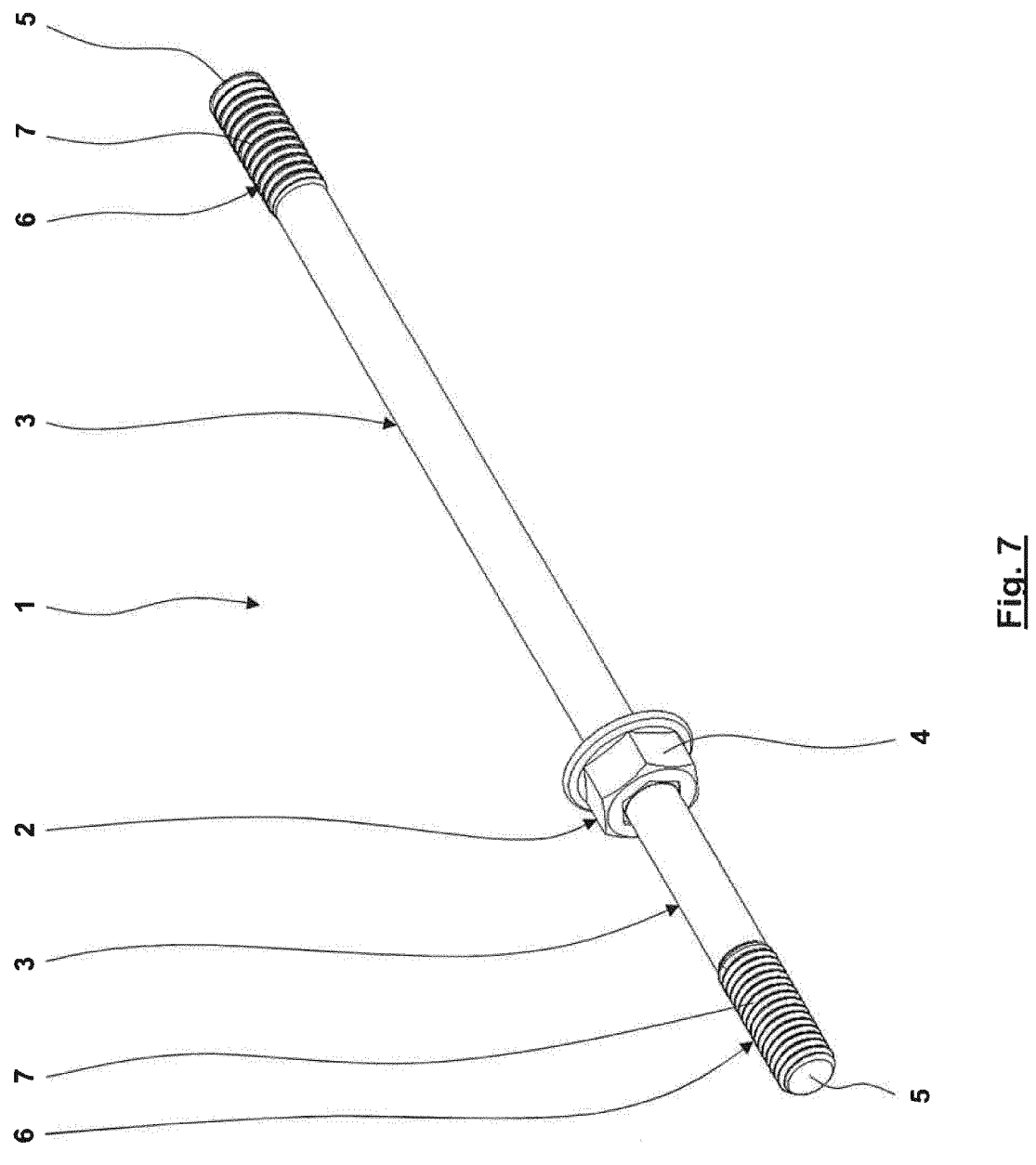
FIG. 7 shows a perspective view of a further embodiment of the new screw.
Figure 8:
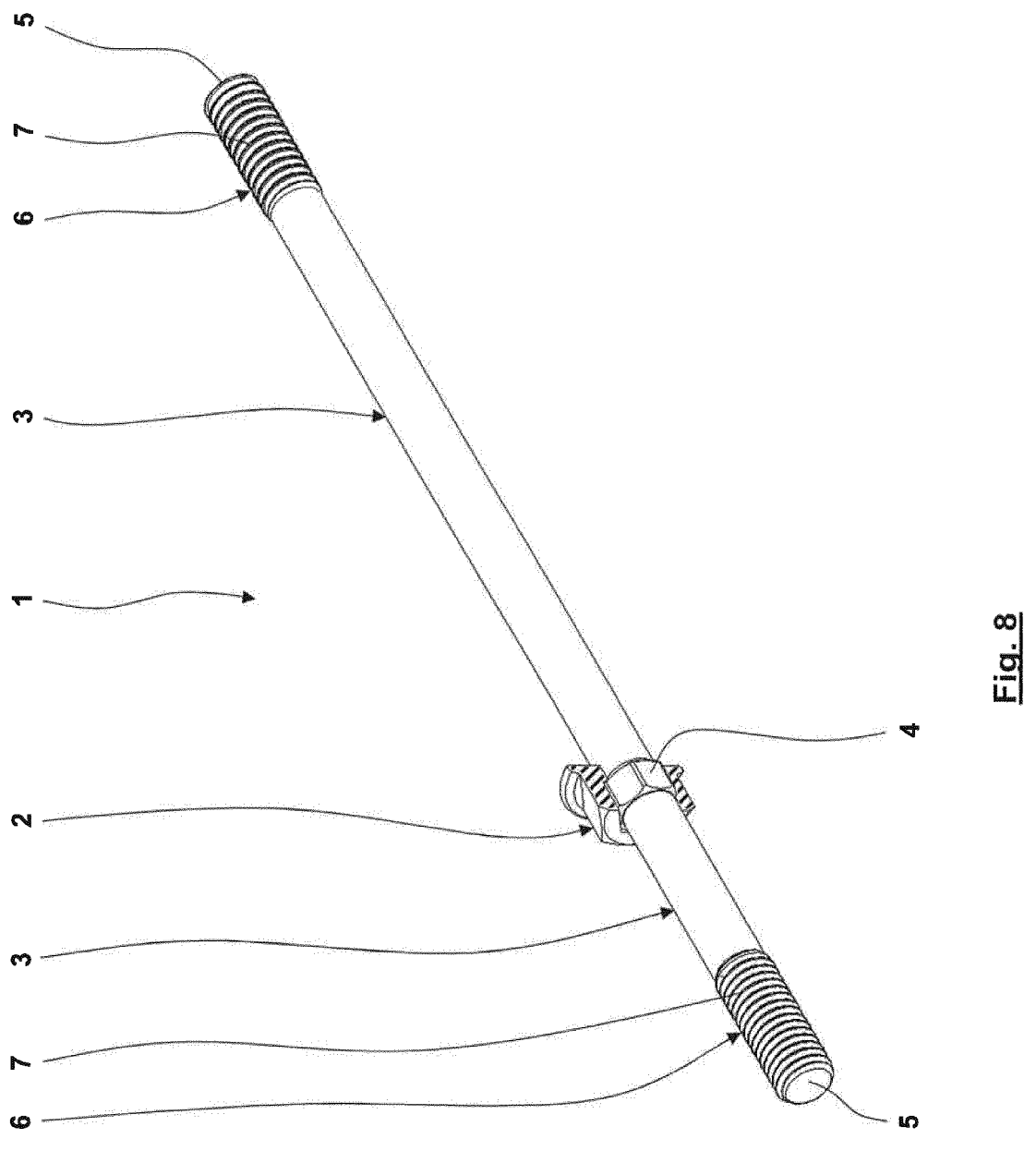
FIG. 8 shows a partially cut away perspective view of the screw according to FIG. 7.

FIGS. 7 and 8 show views of another exemplary embodiment of the new screw 1. In this case, it is a screw 1 with two threaded sections 6. The head 2 is arranged between these two threaded sections 6. Otherwise, the coupling recess 8 and the coupling element 11 are formed in the same way as in the first embodiment of the screw 1 described above.

Figure 11:
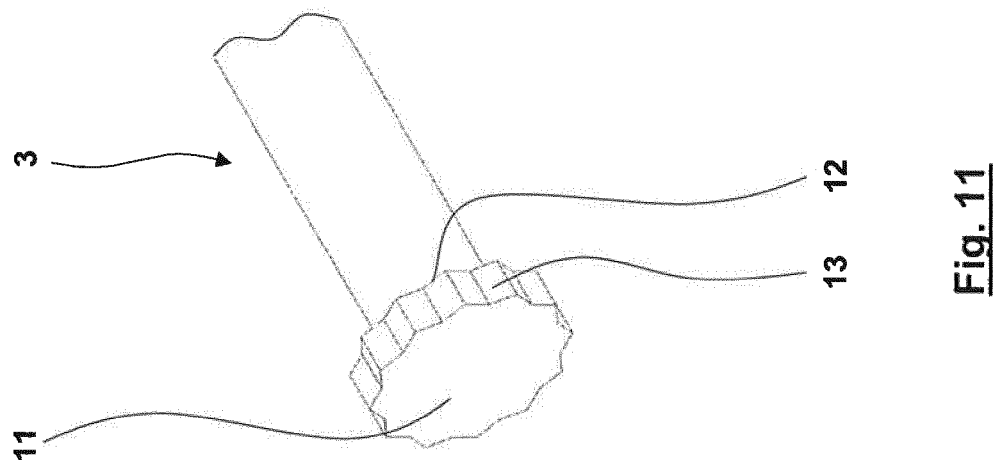
FIG. 11 shows a perspective view of a part of a third embodiment of the coupling element of the shank of the new screw.
Figure 10:
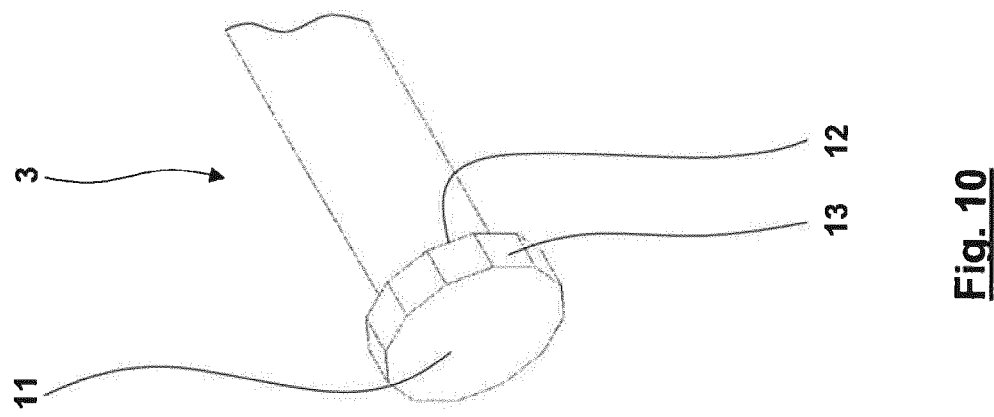
FIG. 10 shows a perspective view of a part of a second embodiment of the coupling element of the shank of the new screw.
Figure 9:
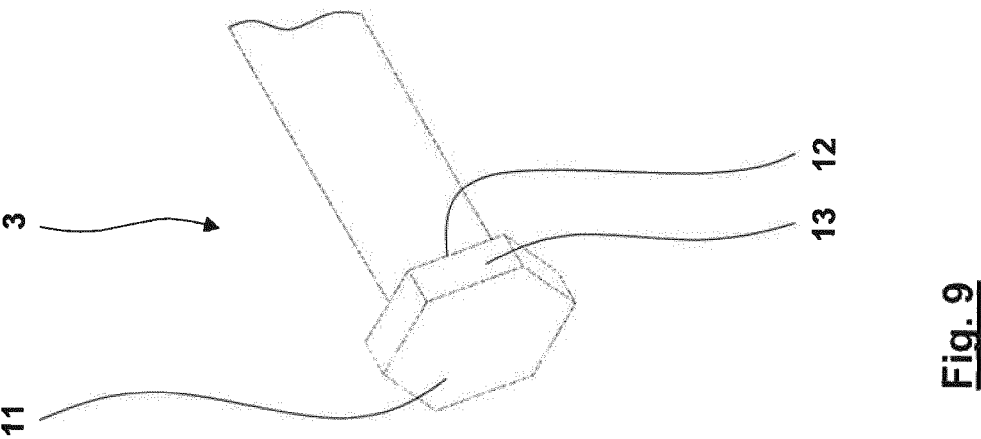
FIG. 9 shows a perspective view of a part of a first embodiment of the coupling element of the shank of the new screw.
Figure 14:
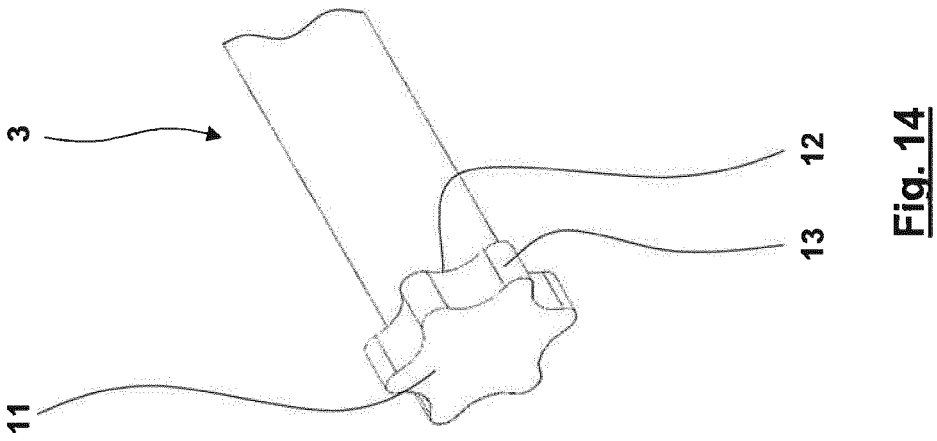
FIG. 14 shows a perspective view of a part of a sixth embodiment of the coupling element of the shank of the new screw.
Figure 13:
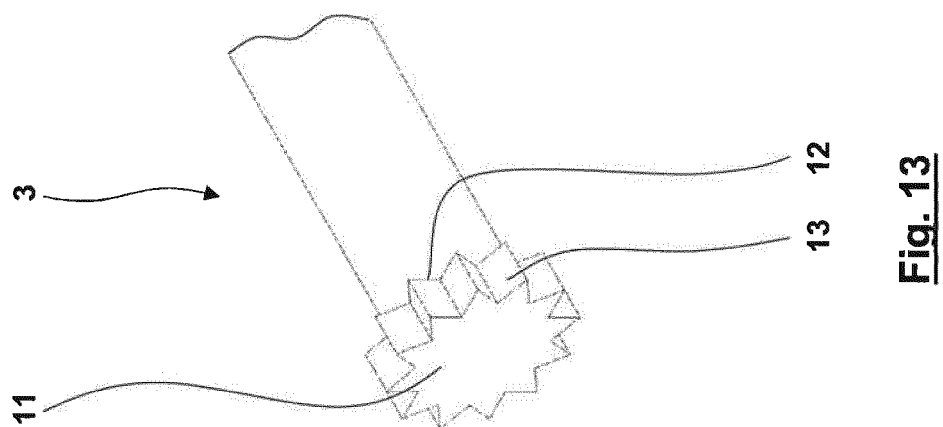
FIG. 13 shows a perspective view of a part of a fifth embodiment of the coupling element of the shank of the new screw.
Figure 12:
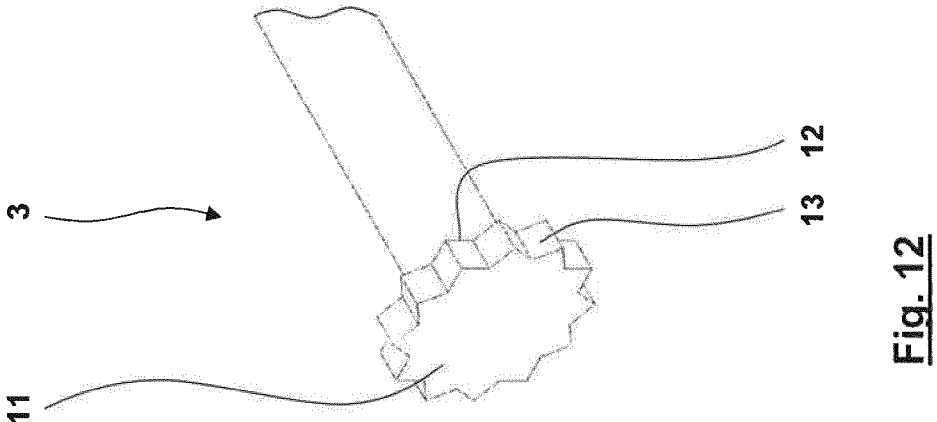
FIG. 12 shows a perspective view of a part of a fourth embodiment of the coupling element of the shank of the new screw.

FIGS. 9-14 show various examples of the design of the coupling element 11 of the shank 3. In FIG. 9, the torque transmission counter element 13 is designed as a hexagon. In FIG. 10, the torque transmission counter element 13 is designed as another design with twelve functional surfaces. In FIG. 11 the torque transmission counter element 13 is designed as a twelve-edge. In FIG. 12, the torque transmission counter element 13 is designed as a twelve-tooth. In FIG. 13 the torque transmission counter element 13 is designed as a twelve-pointed star. In FIG. 14, the torque transmission counter element 13 is designed as a hexagon.

Figure 15:
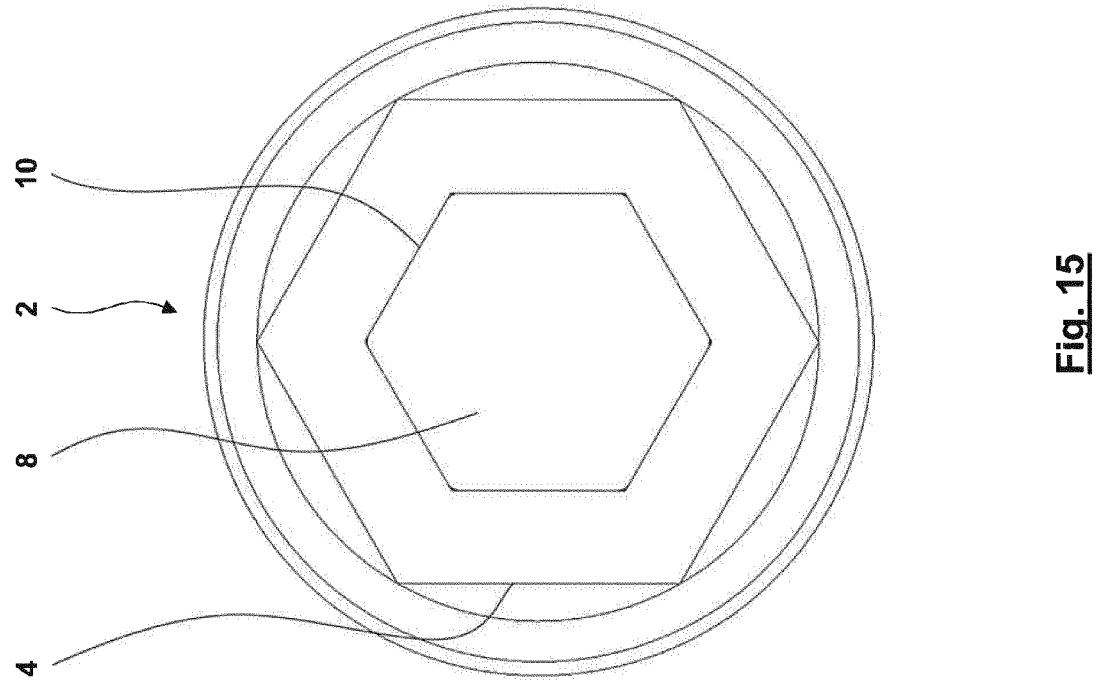
FIG. 15 shows a view of a first exemplary embodiment of the head of the new screw with a coupling recess.
Figure 16:
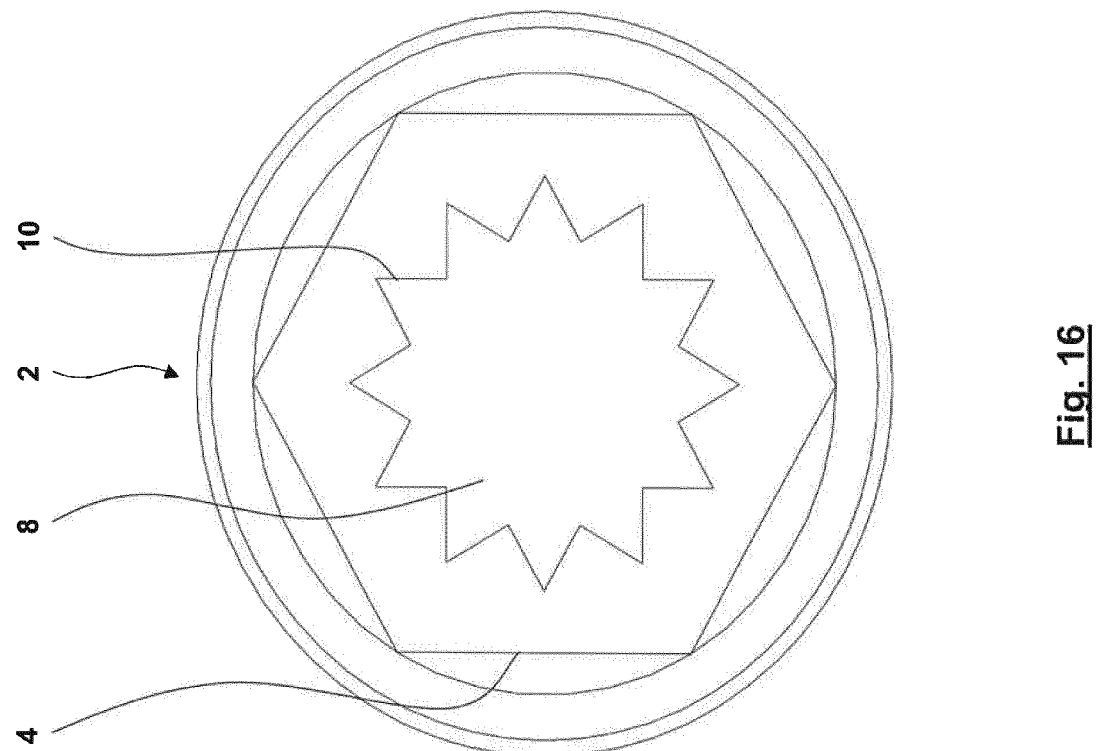
FIG. 16 shows a view of a second exemplary embodiment of the head of the new screw with a coupling recess.
Figure 17:
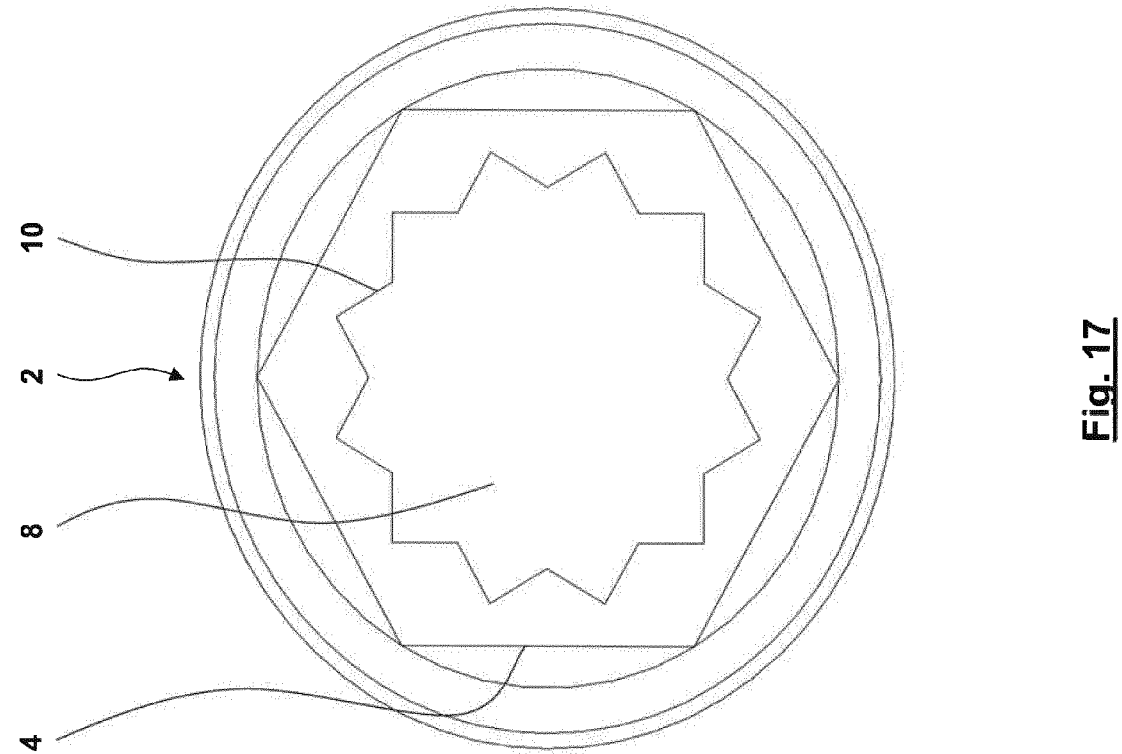
FIG. 17 shows a view of a third exemplary embodiment of the head of the new screw with a coupling recess.
Figure 18:
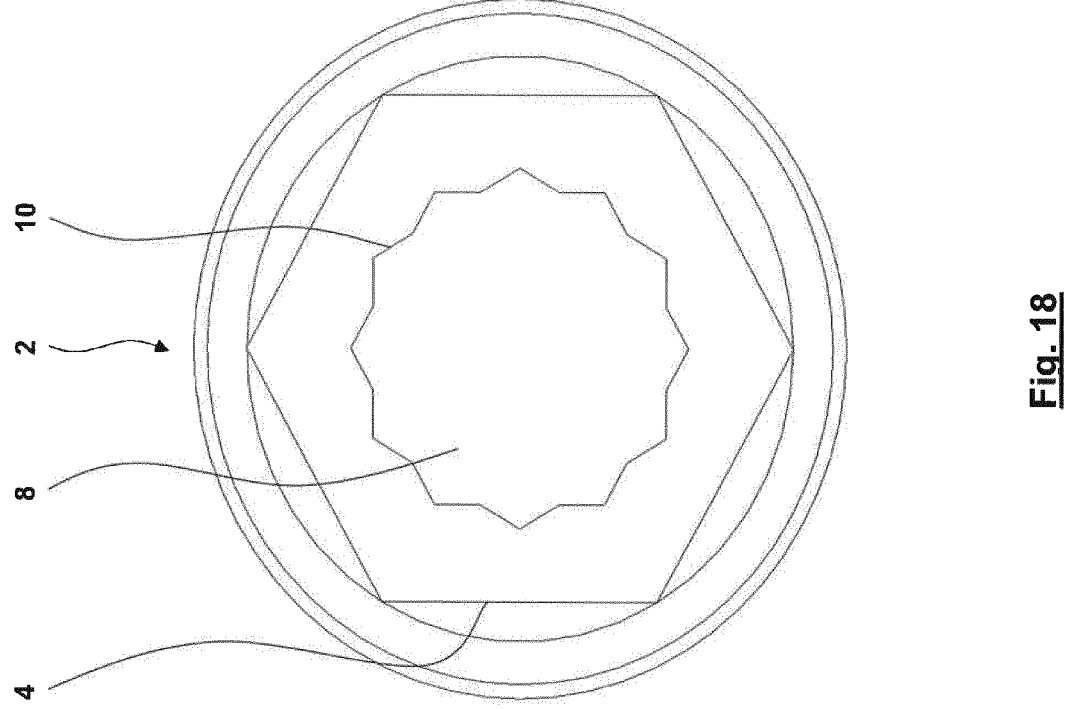
FIG. 18 shows a view of a fourth exemplary embodiment of the head of the new screw with a coupling recess.
Figure 19:
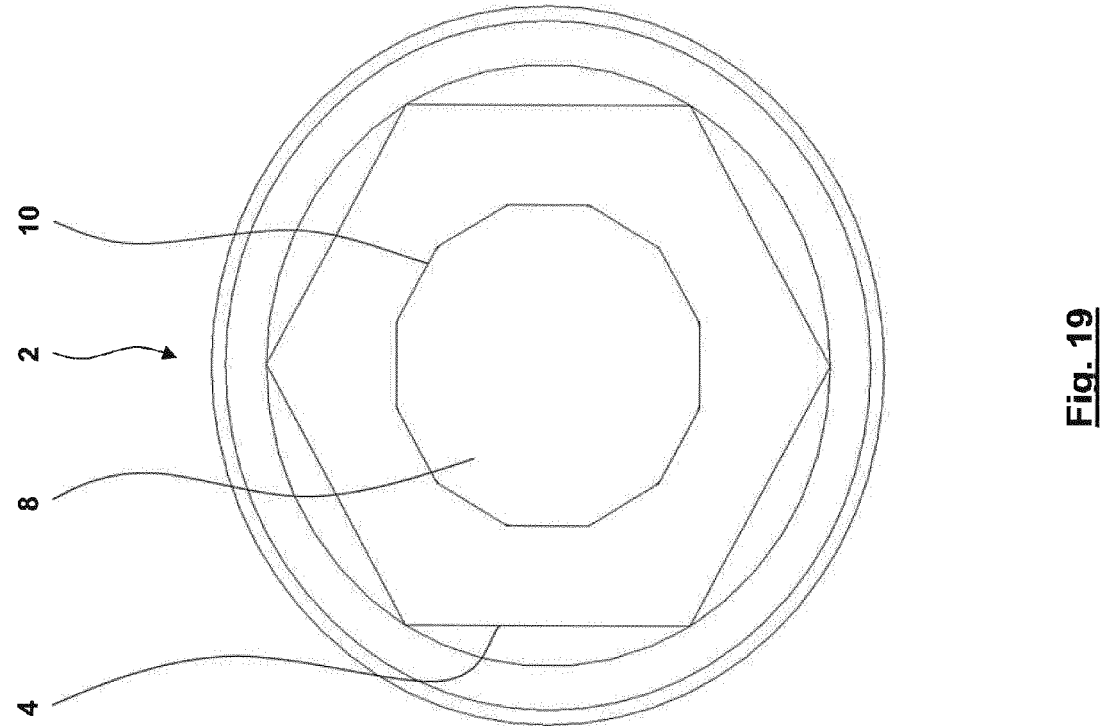
FIG. 19 shows a view of a fifth exemplary embodiment of the head of the new screw with a coupling recess.
Figure 20:
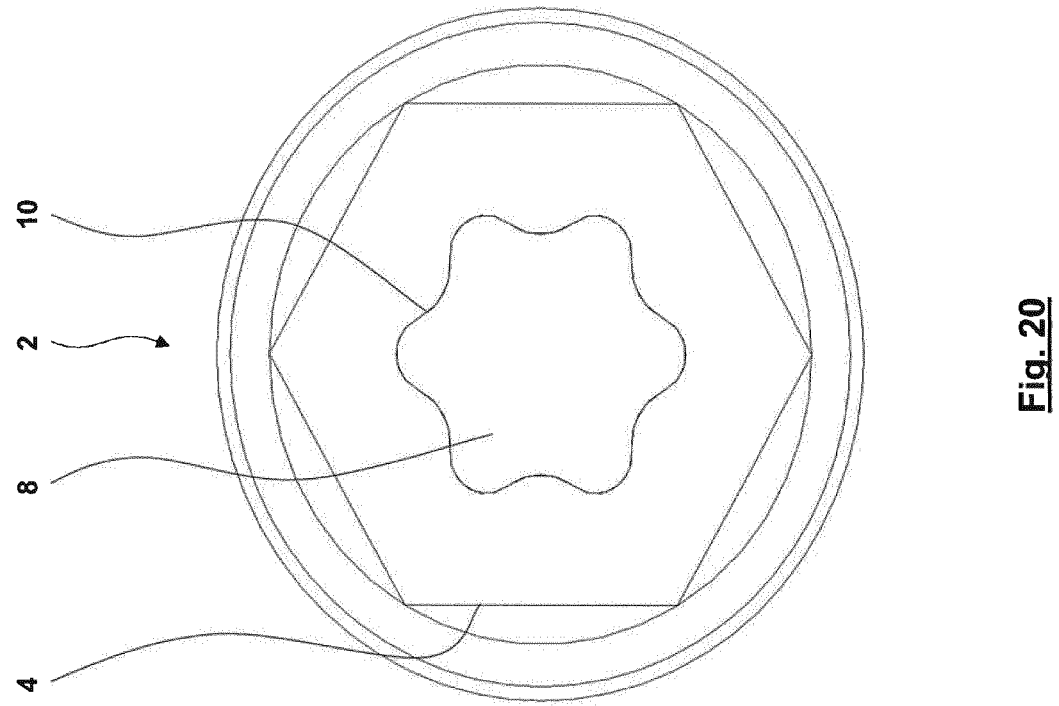
FIG. 20 shows a view of a sixth exemplary embodiment of the head of the new screw with a coupling recess.

FIGS. 15-20 show different embodiments of the head 2 of the new screw 1. In FIG. 15, the torque transmission element 10 of the coupling recess 8 of the head 2 is a hexagon. In FIG. 16 it is a twelve-pointed star. In FIG. 17 it is a twelve-tooth. In FIG. 18 it is a twelve-edge. FIG. 19 shows another design with twelve functional surfaces. FIG. 20 shows a six-round.

Figure 21:
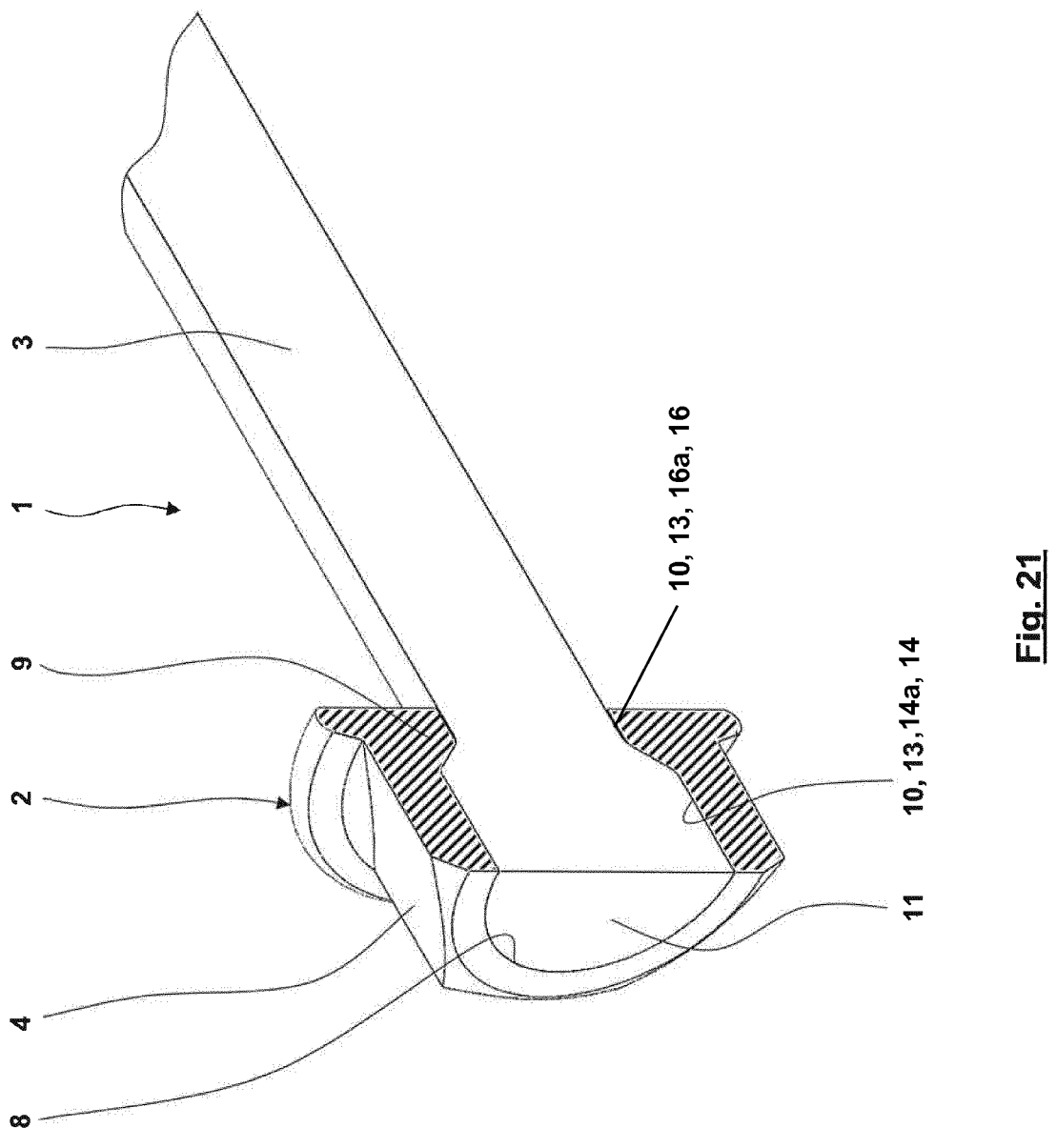
FIG. 21 shows a partially cut away perspective view of a further exemplary embodiment of the new screw.
Figure 22:
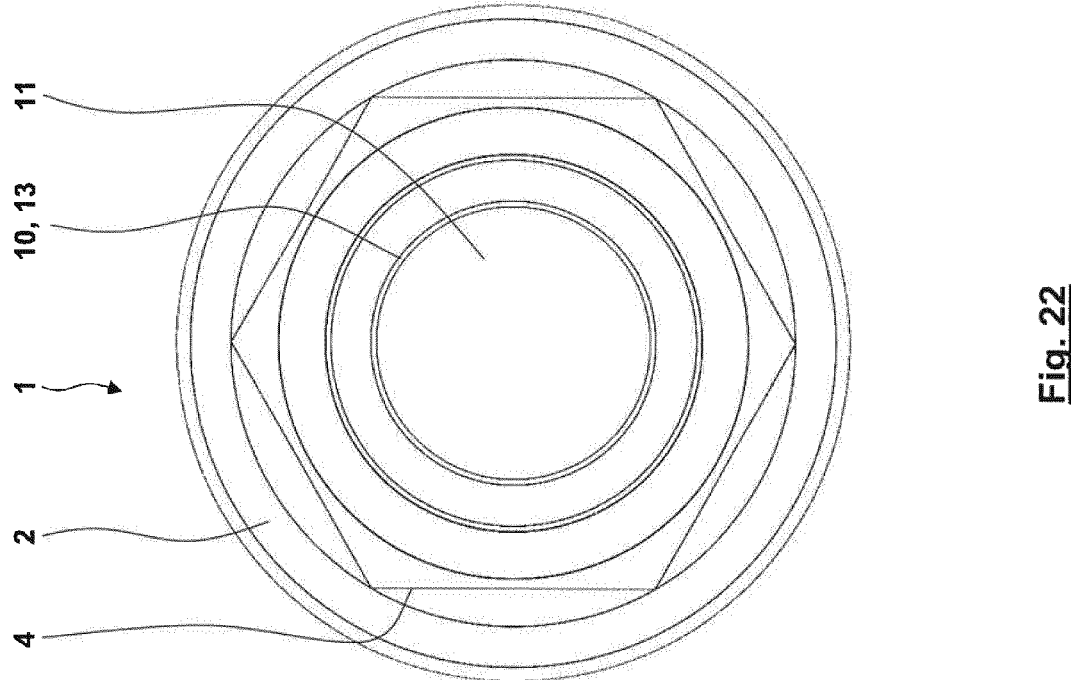
FIG. 22 shows another view of the screw according to FIG. 21.

In FIGS. 21 and 22, an exemplary embodiment of the new screw 1 is shown, in which the torque transmission is not realised by a form fit, but by a force fit. The coupling element 11 thus has a certain oversize compared to the coupling recess 8 and is introduced into the coupling recess 8 in the sense of achieving a negative-allowance fit. In the example shown, this press fit is present both between the first portion 14 and the first section 14a and between the second portion 16 and the second section 16a, so that the torque transmission element 10 and the torque transmission counter-element 13 are each formed by the surfaces which participate in these or this press fit(s), or which form the corresponding surfaces.

Figure 23:
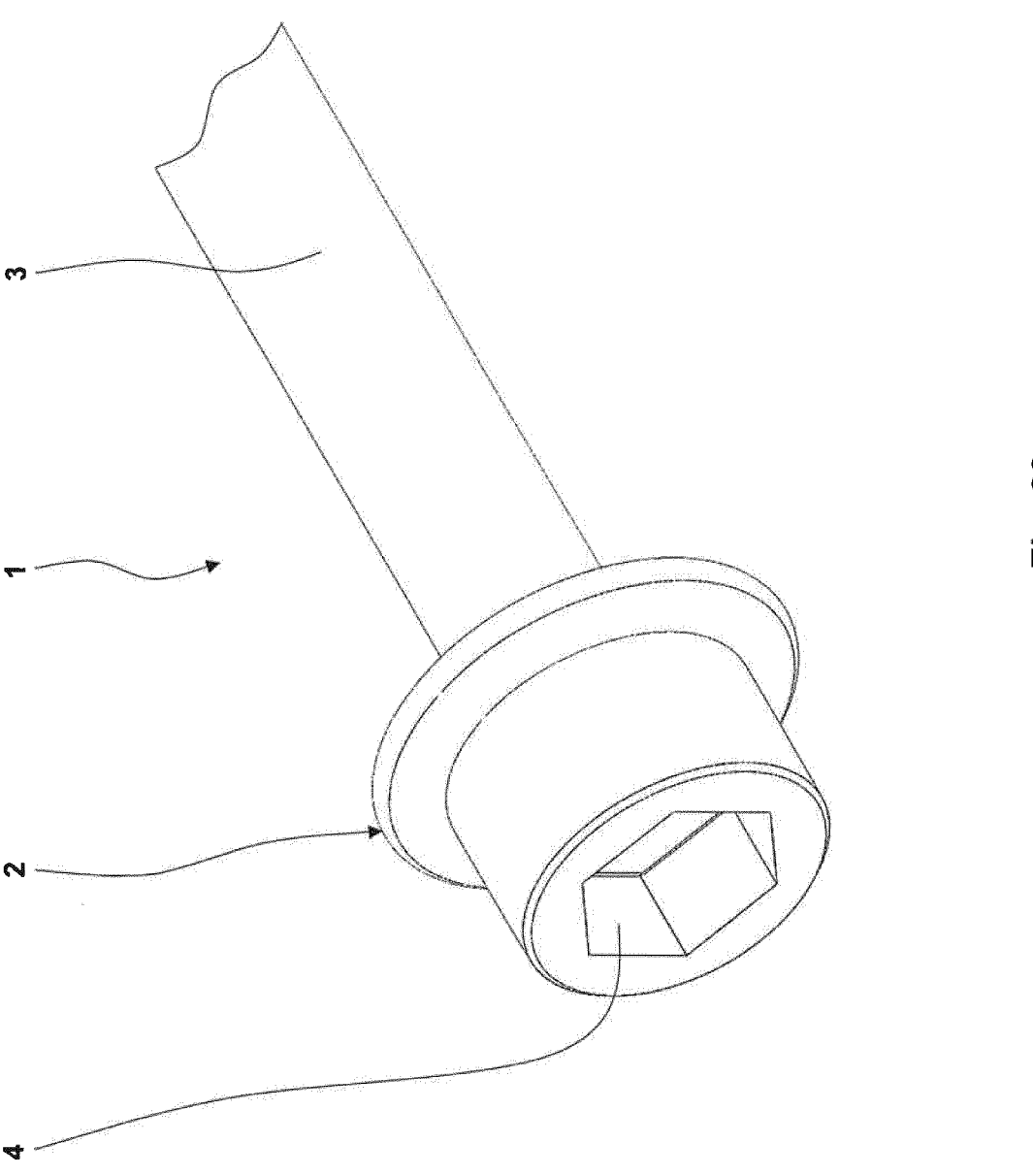
FIG. 23 shows a perspective view of a further exemplary embodiment of the new screw.
Figure 24:
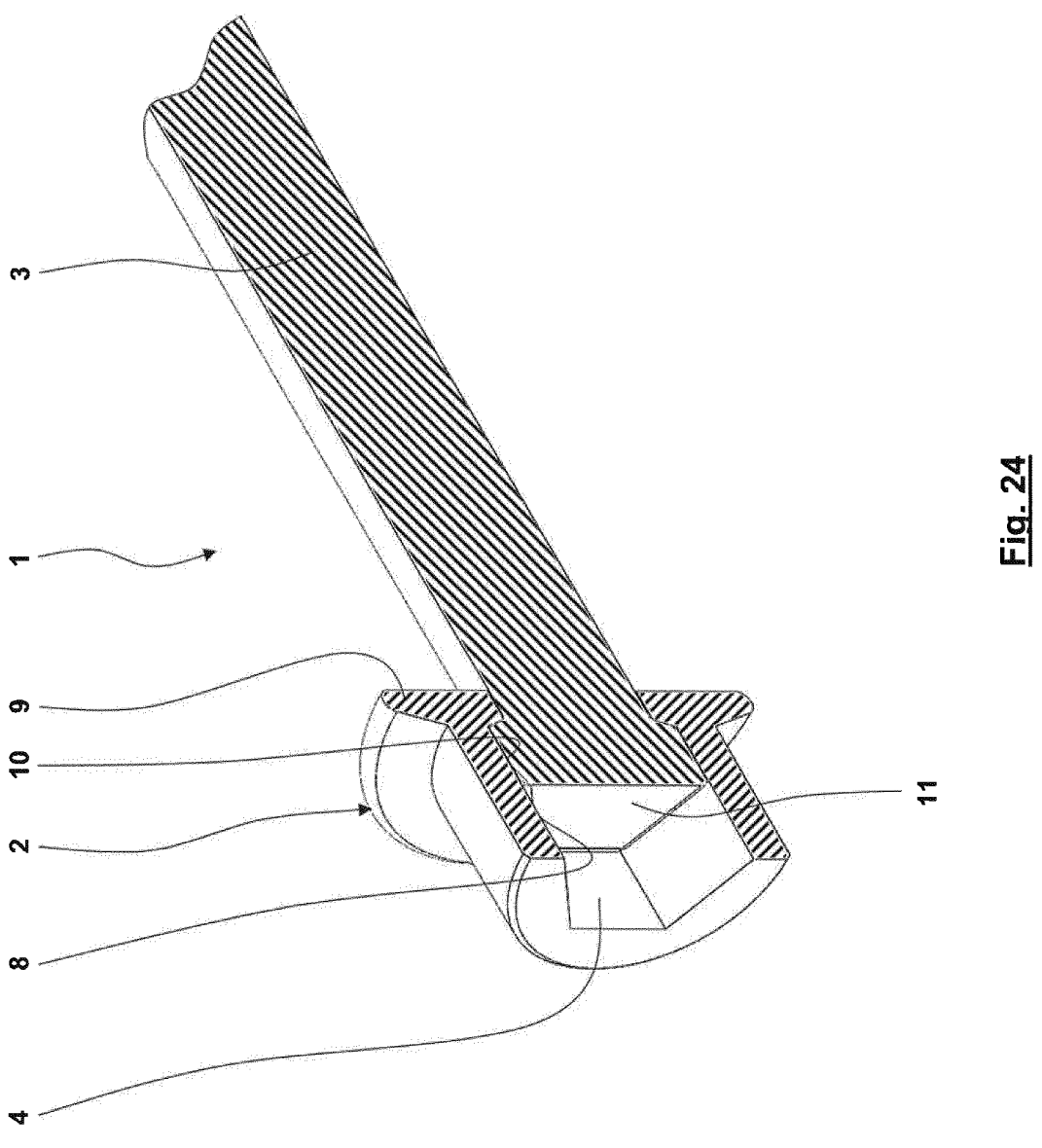
FIG. 24 shows a partially cut away perspective view of the screw according to FIG. 23.
Figure 25:
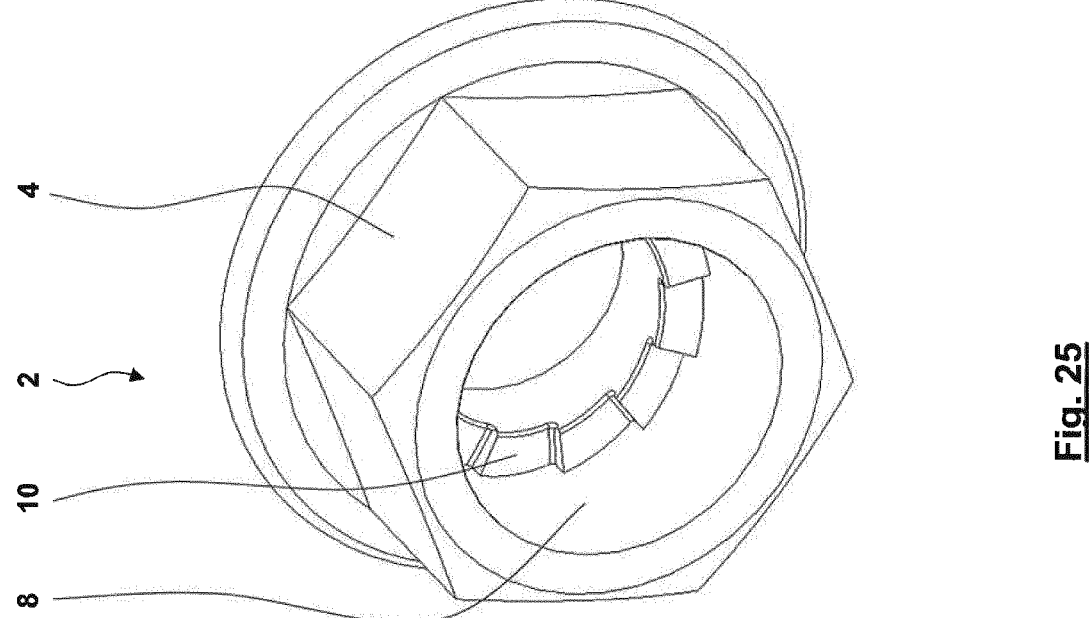
FIG. 25 shows a perspective view of a further exemplary embodiment of the head of the new screw with a coupling recess.
Figure 26:
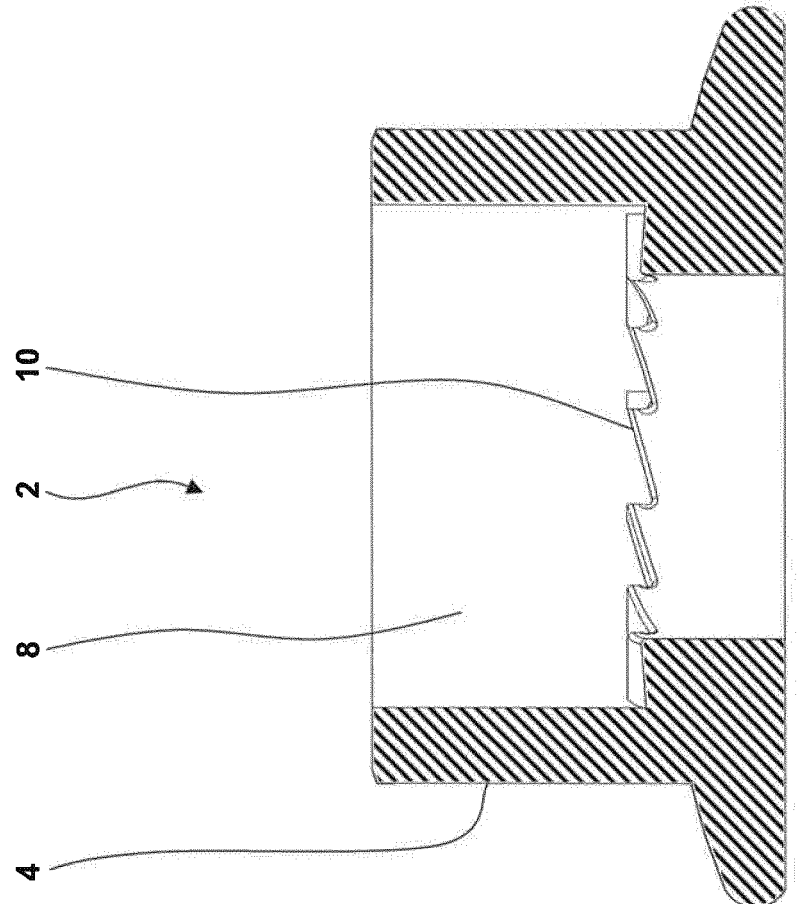
FIG. 26 shows a lateral sectional view of the head of the screw according to FIG. 25.
Figure 27:
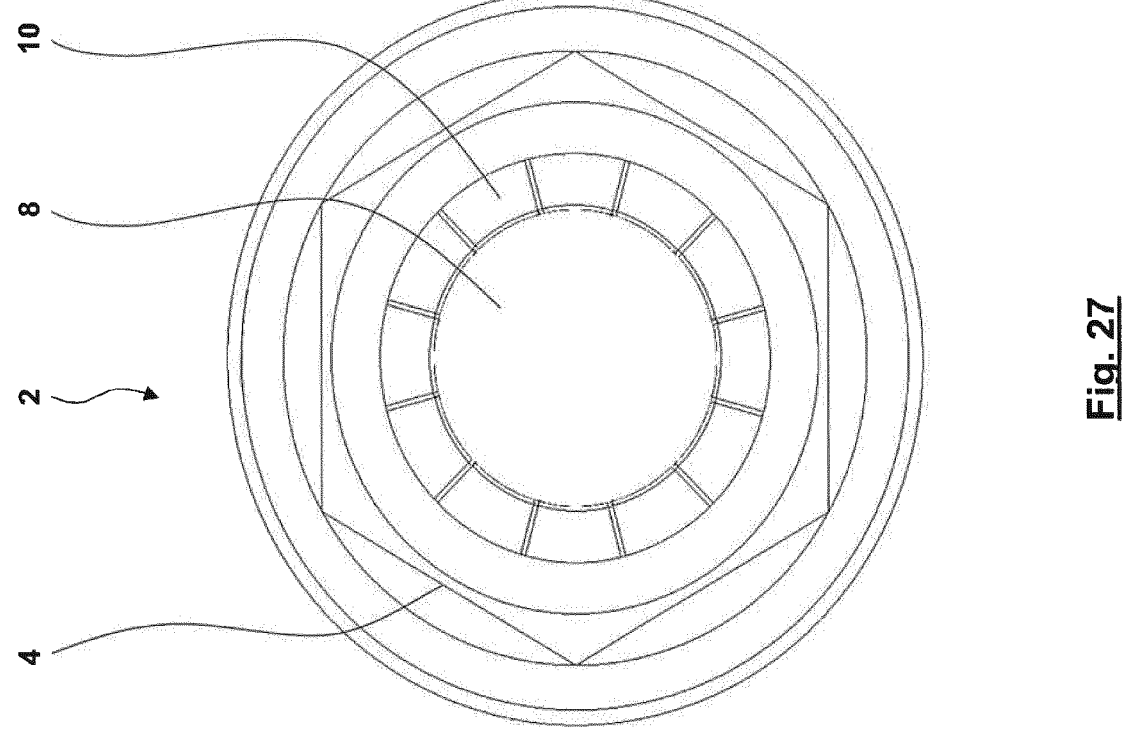
FIG. 27 shows another view of the head of the screw according to FIG. 25.
Figure 28:
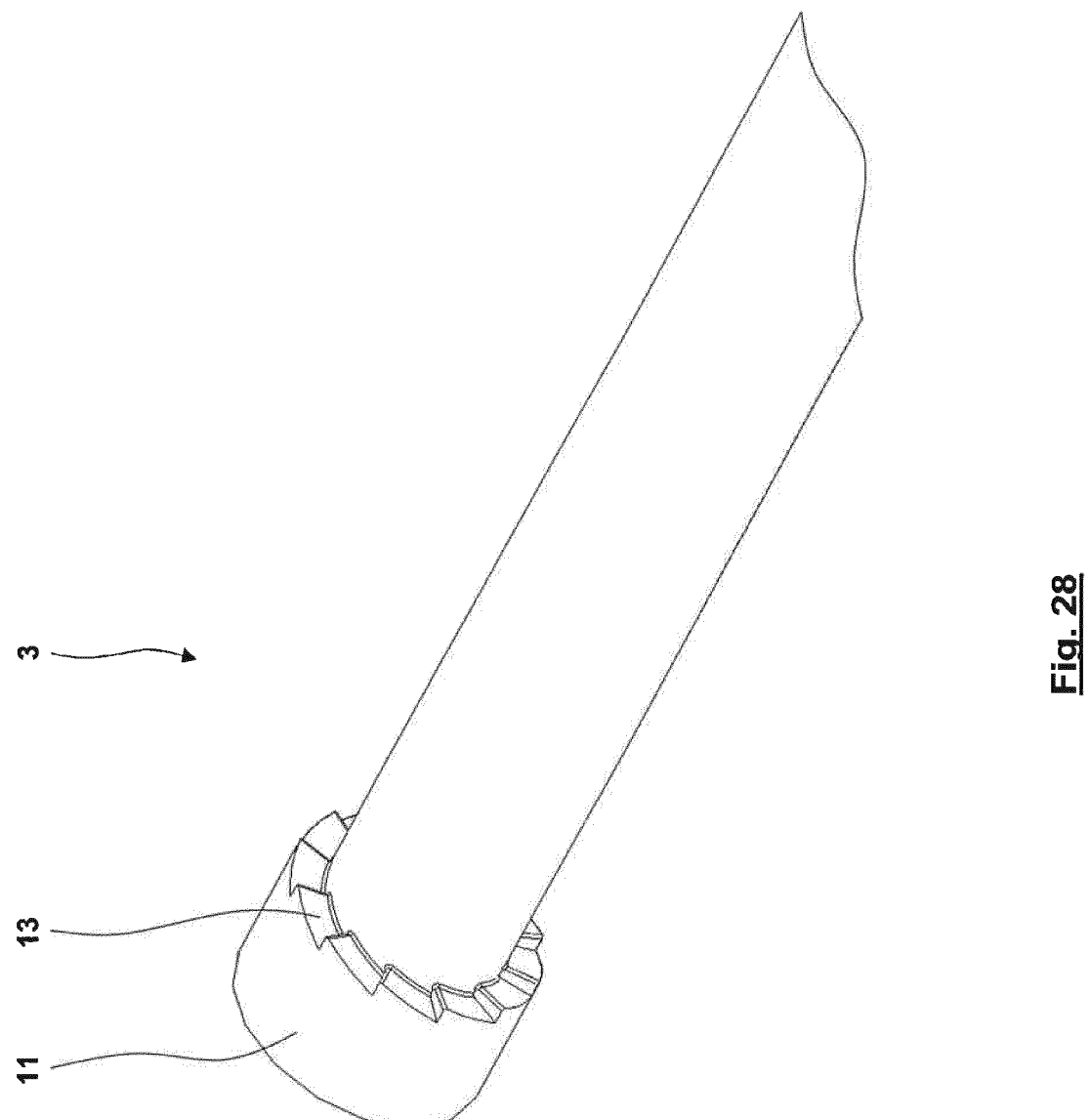
FIG. 28 shows a perspective view of an exemplary embodiment of the shank of the new screw belonging to the head according to FIGS. 25-27.
Figure 29:
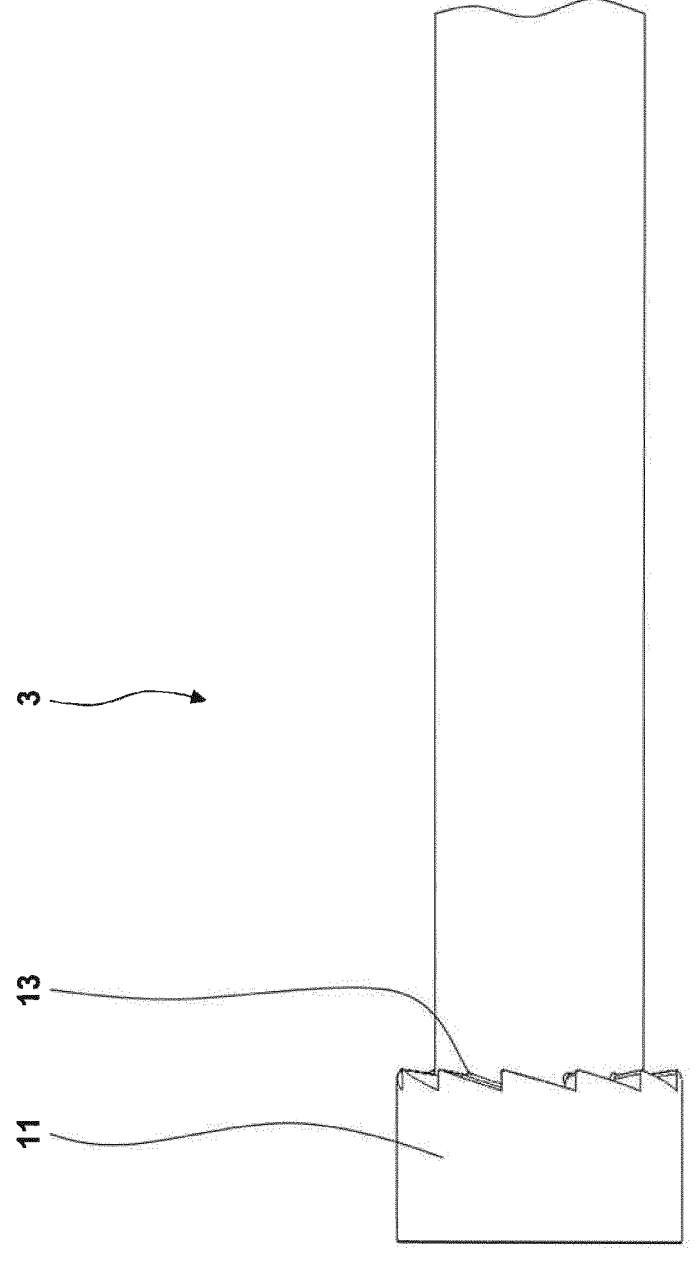
FIG. 29 shows a side view of the shank according to FIG. 28.
Figure 29:

FIGS. 23 and 24 show another exemplary embodiment of the new screw 1. In this case, the tool engagement contour 4 of the screw 1 is designed as a tool engagement inner contour.

FIGS. 25-29 show various views of a further exemplary embodiment of the new screw 1 and of the head 2 and the shank 3. In this case, the torque transmission element 10 and the torque transmission counter element 13 are each formed asymmetrically in the circumferential direction. The asymmetry is selected in such a way that the torque is safely transmitted in the tightening direction of the thread 7, whereas such a torque transmission is not transmitted in the loosening direction of the thread 7 due to the slopes of the torque transmission element 10.

Figures 30A, 30B, 30C, 30D, 30E:
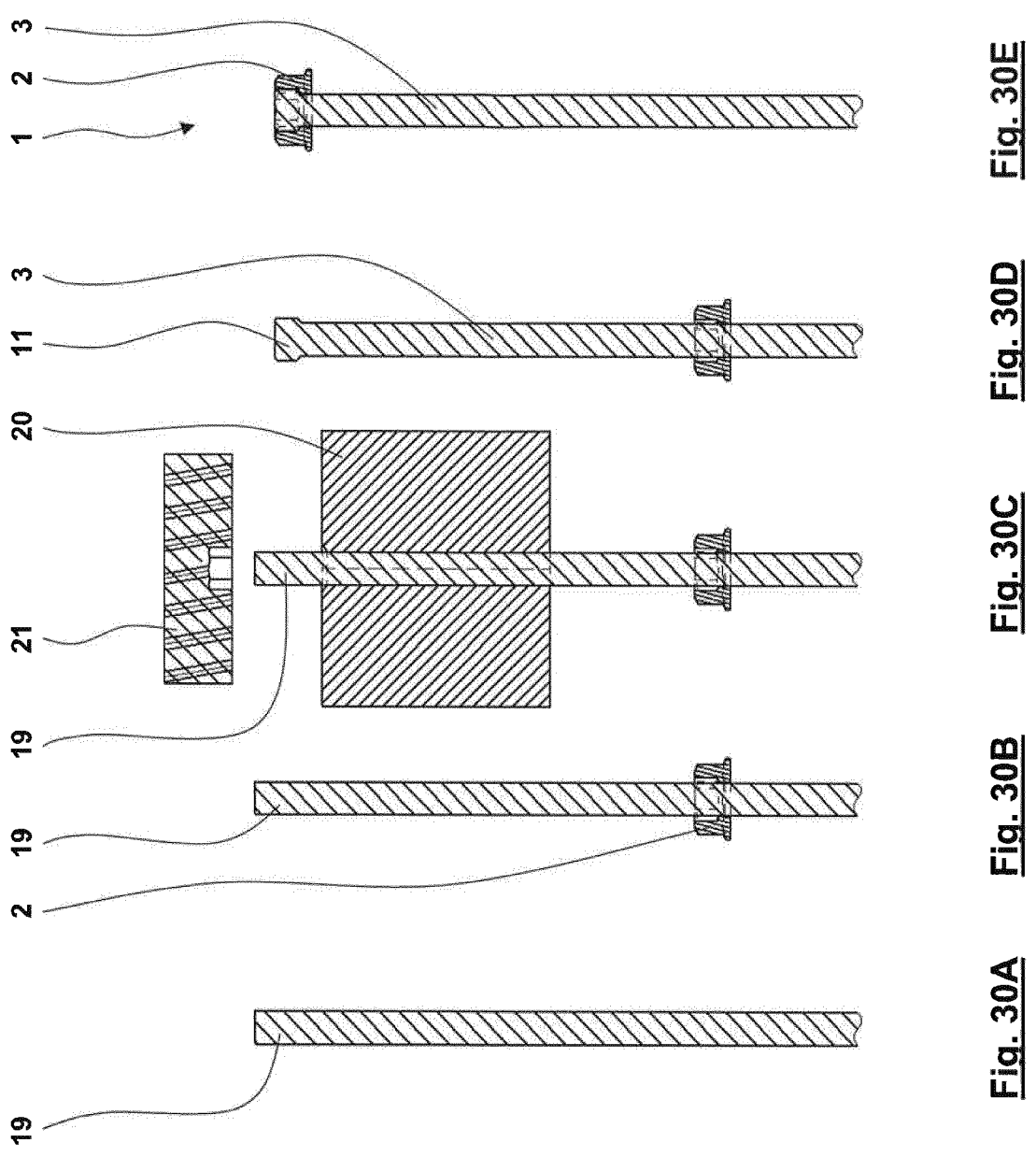
FIG. 30A shows a first step of an exemplary embodiment of the new method for producing the new screw.
FIG. 30B shows a second step of the new method.
FIG. 30C shows a third step of the new method.
FIG. 30D shows a fourth step of the new method.
FIG. 30E shows a fifth step of the new method.

FIGS. 30A-30E show a simplified representation of an exemplary forming method for the mechanical production of a high-strength screw 1 described above. FIG. 30A shows a shank blank 19. In FIG. 30B a head 2 is threaded onto this shank blank 19 by means of its coupling recess 8. This head 2 was previously produced from a head blank in a forming tool. However, the head 2 could also be threaded onto the shank blank 19 or the shank 3 in a later process step. In FIG. 30C the shank blank 19 is held by means of clamping jaws 20 and formed in one part by means of a translationally moved punch 21 in such a way that the coupling element 11 is formed. This is then shown in FIG. 30D. The shank blank 19 has thus become the shank 3. FIG. 30E now also shows the process that takes place after the head 2 and shank 3 have been joined together by translational displacement of the head 2 in the area of the coupling element.

LIST OF REFERENCE SIGNS

1 Screw
2 Head

14

3 Shank
4 Tool engagement contour
5 Free end
6 Threaded section
7 Thread
8 Coupling recess
9 Axial force transmission element/step region
10 Torque transmission element
11 Coupling element
12 Axial force transmission counter element/intermediate section
13 Torque transmission counter element
14 First portion
14a First section
15 First inner diameter
16 Second portion
16a Second section
17 Second inner diameter
18 Collar
19 Shank blank
20 Clamping jaws
21 punch

The invention claimed is:

1. A high-strength screw (1), with
a head (2) with a tool engagement contour (4),
a shank (3) with a free end (5) pointing away from the head (2),
wherein a threaded section (6) with a thread (7) is arranged on the shank (3), wherein the thread (7) is formed as a metric ISO thread or inch thread,
wherein the head (2) and the shank (3) are formed as materially separate parts, wherein the head (2) and the shank (3) comprise a high-strength material with a tensile strength of at least 800 N/mm2,
wherein the head (2) has a coupling recess (8) that is at least partly conical and arranged radially inside with an axial force transmission element (9) and a torque transmission element (10), wherein the axial force transmission element (9) and the torque transmission element (10) are formed as a single piece with the head (2),
wherein the axial force transmission element (9) and the torque transmission element (10) are axially separated from each other in an extension direction of the shank (3),
wherein the shank (3) has a coupling element (11) arranged radially outside on its outer circumference with an axial force transmission counter element (12) and a torque transmission counter element (13),
wherein the coupling element (11) engages in the coupling recess (8),
wherein the axial force transmission element (9) and the axial force transmission counter element (12) are designed and arranged to positively interlock in such a way that an axial transitory movement of the head (2) relative to the shank (3) in the direction away from the free end (5) of the shank (3) is prevented non-releasably, and
wherein the torque transmission element (10) and the torque transmission counter element (13) are designed and arranged to interlock in such a way that a rotational movement of the head (2) relative to the shank (3) in the tightening direction of the thread (7) is frictionally prevented.

2. The high-strength screw (1) according to claim 1, wherein the coupling recess (8) is stepped and has a first portion (14) with a first inner diameter (15) and a second portion (16) with a second inner diameter (17), the first inner diameter (15) being larger than the second inner diameter (17), and wherein the second portion (16) is located closer to the free end (5) of the shank (3) than the first portion (14).

3. The high-strength screw (1) according to claim 2, wherein the second portion (14) forms the axial force transmission element (9) in the sense of an axial stop.

4. The high-strength screw (1) according to claim 3, wherein the coupling element (11) forms an axial counter stop corresponding to the axial stop, the outer diameter of which is greater than the outer diameter of the shank (3) and greater than the second inner diameter (17) of the coupling recess (8).

5. The high-strength screw (1) according to claim 2, wherein the first portion (14) forms the torque transmission element (10).

6. The high-strength screw (1) according to claim 2, wherein the second portion (16) forms the torque transmission element (10).

7. The high-strength screw (1) according to claim 1, wherein the torque transmission element (10) and the torque transmission counter element (13) are designed and arranged to positively interlock.

8. The high-strength screw (1) according to claim 1, wherein the torque transmission element (10) and the torque transmission counter element (13) belong to the geometry type polygon, multi-tooth, multi-round or star.

9. The high-strength screw (1) according to claim 1, wherein the torque transmission element (10) and the torque transmission counter element (13) are designed and arranged to interlock in such a way that a rotational movement of the head (2) relative to the shank (3) in the direction of loosening rotation of the thread (7) is also prevented.

10. The high-strength screw (1) according to claim 1, wherein the torque transmission element (10) and the torque transmission counter element (13) are each formed symmetrically in the circumferential direction.

11. The high-strength screw (1) according to claim 1, wherein the torque transmission element (10) and the torque transmission counter element (13) are formed in such a way that they determine the maximum tightening torque of the screw (1) and, if the maximum tightening torque is exceeded, rotational movement of the head (2) relative to the shank (3) in the tightening direction of the thread (7) is allowed.

12. The high-strength screw (1) according to claim 1, wherein the shank (3) consists of high-strength steel or a fiber composite material, and the head (2) consists of high-strength steel or a fiber composite material.

13. A forming method for the mechanical production of a high-strength screw (1) according to claim 1, from a head blank and a shank blank (19), comprising the steps:

forming the head blank in a forming tool in such a way that a head (2) of a screw (1) with a coupling recess (8) arranged radially inside with an axial force transmission element (9) and a torque transmission element (10) is produced, threading the head (2) by means of the coupling recess (8) onto a shank blank (19), forming a part of the shank blank (19) in a forming tool in such a way that a shank (3) with a coupling element (11) arranged radially outside on its outer circumference with an axial force transmission counter element (12) and a torque transmission counter element (13) is produced, and joining of head (2) and shank (3) by translatory displacement of the head (2) in such a way that the coupling element (11) engages in the coupling recess (8).

14. The forming method according to claim 13, further characterized by the following steps:

before the threading step: forming the head blank in a forming tool in such a way that a tool engagement contour (4) is produced, and/or after the joining step: securing the head (2) to the shank (3) to prevent axial translational movement of the head (2) relative to the shank (3) in the direction of the free end (5) of the shank (3), and/or wherein the forming is in each case cold forming, and/or wherein the forming of the part of the shank blank (19) takes place by means of a translatory moved punch (21), and/or wherein the shank blank (19) is held by clamping jaws (20) during forming.

\* \* \* \* \*